US012750507B2

(12) United States Patent
Sparano

(10) Patent No.: US 12,750,507 B2
(45) Date of Patent: Sep. 29, 2026

(54) PROCESSING A MULTI-LAYER VIDEO STREAM

(71) Applicant: V-NOVA INTERNATIONAL LIMITED, London (GB)

(72) Inventor: Daniele Sparano, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 79 days.

(21) Appl. No.: 18/712,195

(22) PCT Filed: Nov. 21, 2022

(86) PCT No.: PCT/GB2022/052949

§ 371 (c)(1),
(2) Date: May 21, 2024

(87) PCT Pub. No.: WO2023/089340

PCT Pub. Date: May 25, 2023

(65) Prior Publication Data

US 2025/0008130 A1 Jan. 2, 2025

(30) Foreign Application Priority Data

| | | | |
|---|---|---|---|
| Nov. 22, 2021 | (GB) | ...................................... | 2116781 |
| Jan. 18, 2022 | (GB) | ...................................... | 2200609 |
| Jan. 19, 2022 | (GB) | ...................................... | 2200674 |

(51) Int. Cl.

| | |
|---|---|
| ***H04N 19/30*** | (2014.01) |
| ***H04N 19/154*** | (2014.01) |
| ***H04N 19/169*** | (2014.01) |
| ***H04N 19/467*** | (2014.01) |

(52) U.S. Cl.
CPC ........... *H04N 19/30* (2014.11); *H04N 19/154* (2014.11); *H04N 19/188* (2014.11); *H04N 19/467* (2014.11)

(58) Field of Classification Search
CPC .... H04N 19/30; H04N 19/154; H04N 19/188; H04N 19/467; H04N 21/23605; H04N 21/44; H04N 21/8451; H04N 21/234327
See application file for complete search history.

(56) References Cited

U.S. PATENT DOCUMENTS 7,116,717 B1 * 10/2006 Eshet .................. H04N 19/154 375/240.26
7,519,118 B2 * 4/2009 Lin .................... G11B 27/3027 375/240.1
10,893,305 B2 * 1/2021 van der Schaar ............................ H04N 21/234381

(Continued)

FOREIGN PATENT DOCUMENTS

WO WO-03094533 A1 * 11/2003 ........... H04L 1/1877
WO WO-2005099271 A1 * 10/2005 ............. H04N 19/89

OTHER PUBLICATIONS

"Working Draft of Low Complexity Enhancement Video Coding", ISO/IEC JTC 1/SC 29/WG 11, N18454, Geneva, CH, Mar. 2019 (Year: 2019).*

(Continued)

*Primary Examiner* — Maria E Vazquez Colon
(74) *Attorney, Agent, or Firm* — Workman Nydegger

(57) ABSTRACT

Video processing methods are described. In particular, examples are presented of multi-layer video processing, such as approaches for the flexible encoding and decoding of multi-layer schemes.

19 Claims, 13 Drawing Sheets

(56) References Cited

U.S. PATENT DOCUMENTS

| | | | | |
|---|---|---|---|---|
| 11,711,552 | B2 * | 7/2023 | van der Schaar | H04N 21/25825 725/116 |
| 2011/0110436 | A1 * | 5/2011 | Schierl | H04N 21/4305 375/E7.2 |
| 2012/0044999 | A1 | 2/2012 | Kim et al. | |
| 2016/0227233 | A1 | 8/2016 | Cho et al. | |
| 2017/0085890 | A1 | 3/2017 | Choi et al. | |
| 2021/0250593 | A1 | 8/2021 | Suehring et al. | |
| 2021/0306646 | A1 * | 9/2021 | Suehring | H04N 19/30 |
| 2022/0321896 | A1 * | 10/2022 | Deshpande | H04N 19/188 |

OTHER PUBLICATIONS

Office Action received for EP Patent Application No. 22812754.4, mailed on Apr. 8, 2025, 6 pages.

International Search Report for application No. PCT/GB2022/052949 dated Jan. 25, 2023.

Written Opinion of the International Searching Authority for application No. PCT/GB2022/052949 dated Jan. 17, 2023.

* cited by examiner

PROCESSING A MULTI-LAYER VIDEO STREAM

CROSS-REFERENCE TO RELATED APPLICATIONS

This application is a 371 US Nationalization of International Application No. PCT/GB2022/052949, filed Nov. 21, 2022, which claims priority from GB Patent Application No: 2116781.2, filed Nov. 22, 2021, GB Patent Application No: 2200609.2, filed Jan. 18, 2022, and GB Patent Application No: 2200674.6, filed Jan. 19, 2022, the disclosures of which are hereby incorporated herein by reference in their entirety.

TECHNICAL FIELD

The present invention relates to the processing of a multi-layer video stream. In particular, the present invention relates to one or more of the encoding and the decoding of a multi-layer video stream, for example using different approaches to communicate the multi-layer stream to a decoding device and enable efficient decoding.

BACKGROUND

Multi-layer video coding schemes have existed for a number of years but have experienced problems with widespread adoption. Much of the video content on the Internet is still encoded using H.264 or MPEG-4 Part 10, Advanced Video Coding (MPEG-4 AVC), with this format being used for between 80-90% of online video content. This content is typically supplied to decoding devices as a single video stream that has a one-to-one relationship with available hardware and/or software video decoders, e.g. a single stream is received, parsed and decoded by a single video decoder to output a reconstructed video signal. Many video decoder implementations are thus developed according to this framework. To support different encodings, decoders are generally configured with a simple switching mechanism that is driven based on metadata identifying a stream format.

Existing multi-layer coding schemes include the Scalable Video Coding (SVC) extension to H.264, Scalable extensions to H.265 or MPEG-H Part 2 High Efficiency Video Coding (SHVC), and newer standards such as MPEG-5 Part 2 Low Complexity Enhancement Video Coding (LCEVC). While H.265 is a development of the coding framework used by H.264, LCEVC takes a different approach to scalable video. SVC and SHVC operate by creating different encoding layers and feeding each of these with a different spatial resolution. Each layer encodes the input according to a normal AVC or HEVC encoder with the possibility of leveraging information generated by lower encoding layers. LCEVC, on the other hand, generates one or more layers of enhancement residuals as compared to a base encoding, where the base encoding may be of a lower spatial resolution.

One reason for the slow adoption of multi-layer coding schemes has been the difficulty adapting existing and new decoders to process multi-layer encoded streams. As discussed above, video streams are typically single streams of data that have a one-to-one pairing with a suitable decoder, whether implemented in hardware or software or a combination of the two. Client devices and media players, including Internet browsers, are thus built to receive a stream of data, determine what video encoding the stream uses, and then pass the stream to an appropriate video decoder. Within this framework, multi-layer schemes such as SVC and SHVC have typically been packaged as larger single video streams containing multiple layers, where these streams may be detected as "SVC" or "SHVC" and the multiple layers extracted from the single stream and passed to an SVC or SHVC decoder for reconstruction. This approach though often mitigates some of the benefits of multi-layer encodings. Hence, many developers and engineers have concluded that multi-layer coding schemes are too cumbersome and return instead to a multicast of single H.264 video streams.

It is thus desired to obtain an improved method and system for decoding multi-layer video data that overcomes some of the disadvantages discussed above and that allows more of the benefits of multi-layer coding schemes to be realised.

The paper "The Scalable Video Coding Extension of the H.264/AVC Standard" by Heiko Schwarz and Mathias Wien, as published in IEEE Signal Processing Magazine 135, March 2008, provides an overview of the SVC extension.

The paper "Overview of SHVC: Scalable Extensions of the High Efficiency Video Coding Standard" by Jill Boyce, Yan Ye, Jianle Chen, and Adarsh K. Ramasubramonian, as published in IEEE Transactions on Circuits and Systems for Video Technology, VOL. 26, NO. 1, January 2016, provides an overview of the SHVC extensions.

The decoding technology for LCEVC is set out in the Draft Text of ISO/IEC FDIS 23094-2 as published at Meeting 129 of MPEG in Brussels in January 2020, as well as the Final Approved Text and WO 2020/188273 A1. FIG. 29B of WO 2020/188273 A1 describes a hypothetical reference decoder where a demuxer provides a base bitstream to a base decoder and an enhancement bitstream to an enhancement decoder.

US 2010/0272190 A1 describes a scalable transmitting/receiving apparatus and a method for improving availability of a broadcasting service, which can allow a reception party to select an optimum video according to an attenuation degree of a broadcasting signal by scalably encoding video data and transmitting it by a different transmission scheme for each layer. US 2010/0272190 A1 encodes HD and SD video streams using an H.264 scalable video encoder (i.e., using SVC) and generates different layers of the SVC encoding using different packet streams. At a decoding device, a DVB-S2 receiver/demodulator receives/demodulates a satellite broadcasting signal from a transmitting satellite and restores a first layer packet stream and a second layer packet stream. At the decoding device, a scalable combiner combines the restored first- and second-layer packet streams in input order generating a single transport stream. A subsequent demultiplexer demultiplexes and depacketizes the combined transport stream and splits it into first- and second-layer video streams, which are then passed to an H.264 scalable video decoder for decoding and generation of a reconstruction of the original HD video stream.

WO 2017/141038 A1 describes a physical adapter that is configured to receive a data stream comprising data useable to derive a rendition of a signal at a first level of quality and reconstruction data produced by processing a rendition of the signal at a second, higher level of quality and indicating how to reconstruct the rendition at the second level of quality using the rendition at the first level of quality. WO 2017/141038 A1 describes how a presentation timestamp (PTS) may be used to synchronise different elementary streams, a first elementary stream with a first packet identifier (PID) and a second elementary stream with a second packet identifier (PID).

With multi-layer streams there is also a general problem of stream management. Different layers of a multi-layer stream may be generated together or separately, and may be supplied together or separately. It is desired to have improved methods and systems for transmission and re-transmission of multi-layer streams over a network. For example, it is desired to allow content distributors to easily and flexibility modify video quality by adding additional layers in a multi-layer scheme. It is also desired to be able to flexibly re-multiplex multi-layer video streams without breaking downstream multi-layer decoding.

There is also a problem of supplying multi-layer streams as static file formats. For example, video streams may be read from fixed or portable media, such as solid-state devices or portable disks, or downloaded and stored as a file for later viewing. It is difficult to support the carriage of multi-layer video with existing file formats, as these file formats typically assume a one-to-one mapping with media content and decoding configurations, whereas multi-layer streams may use different decoding configurations for different layers. Changes in file formats often do not work practically, as they require updates to decoding hardware and software and may affect the decoding of legacy formats.

All of the above publications set out above are to be incorporated by reference herein.

SUMMARY OF THE INVENTION

Aspects of the present invention are set out in the appended independent claims. Variations of these aspects are set out in the appended dependent claims.

DETAILED DESCRIPTION

Certain examples described herein allow decoding devices to be easily adapted to handle multi-layer video coding schemes. Certain examples are described with reference to an LCEVC multi-layer video stream, but the general concepts may be applied to other multi-layer video schemes including SVC and SHVC, as well as multi-layer watermarking and content delivery schemes.

Different examples are presented. In one set of examples a single or joint packet stream is generated for the multi-layer video stream. This may be a joint elementary packet stream. The single or joint packet stream may be processed in a one-to-one manner by existing decoders despite containing data for multiple levels or layers of the multi-layer video stream. For example, backward compatibility may be maintained by passing a single or joint data stream comprising encoded data for multiple layers to a first layer decoder, where the configuration of the single or joint data stream is such that data relating to layers other than the first layer is ignored. Other layer decoders, including those that operate according to different decoding methods (e.g., based on different video coding standards) may receive either the single or joint data stream or other layer data from said stream and provide enhancements to the first layer decoding.

Figure 1:
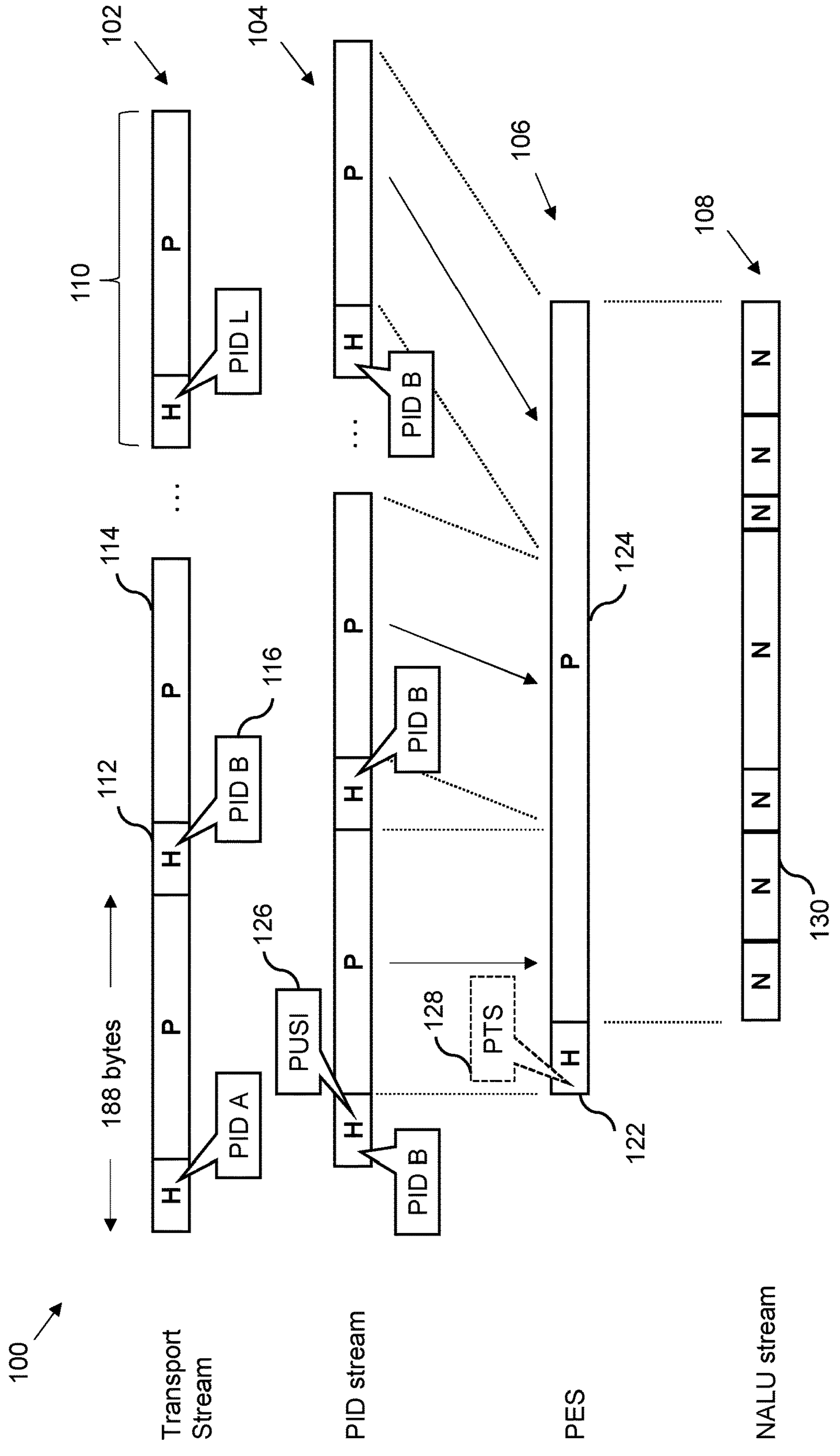
FIG. 1 is a schematic diagram showing how encoded video data may be transported within various data streams.
Figure 2A:
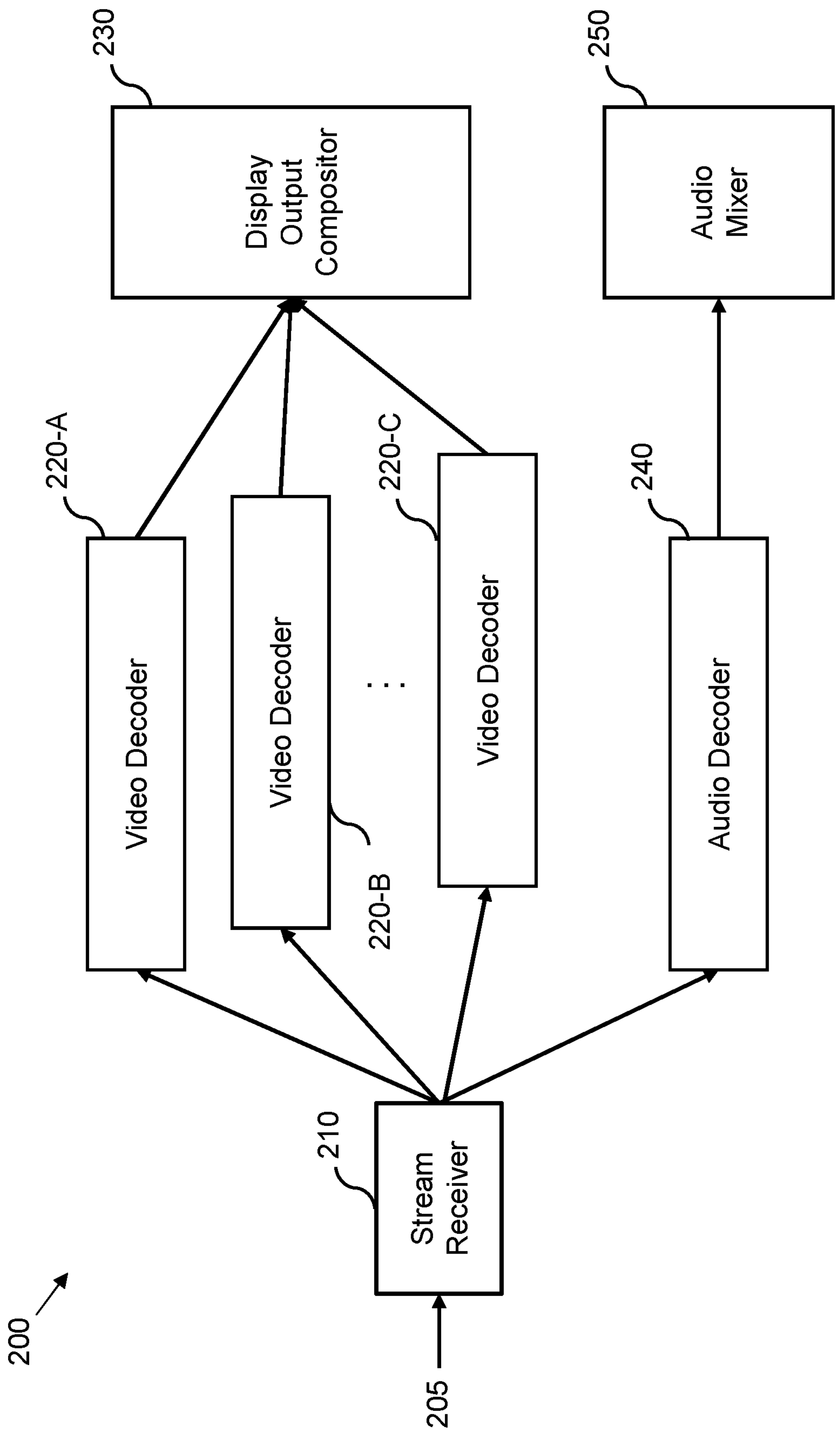
FIG. 2A is a schematic diagram showing an example system for receiving and decoding multiple streams of encoded data.
Figure 2B:
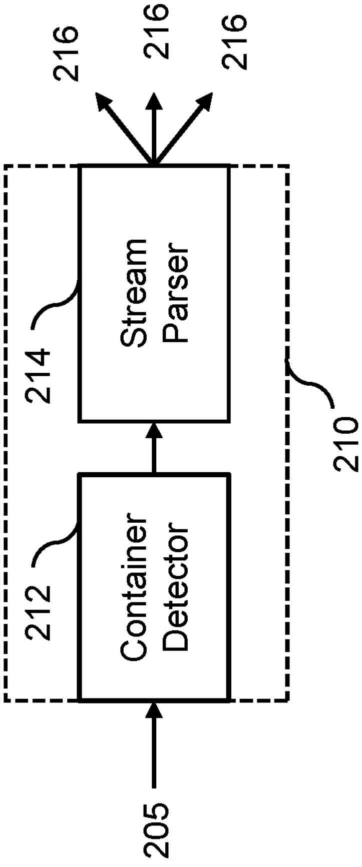
FIGS. 2B and 2C are schematic diagrams respectively showing example components of a stream receiver and a video decoder.
Figure 2C:
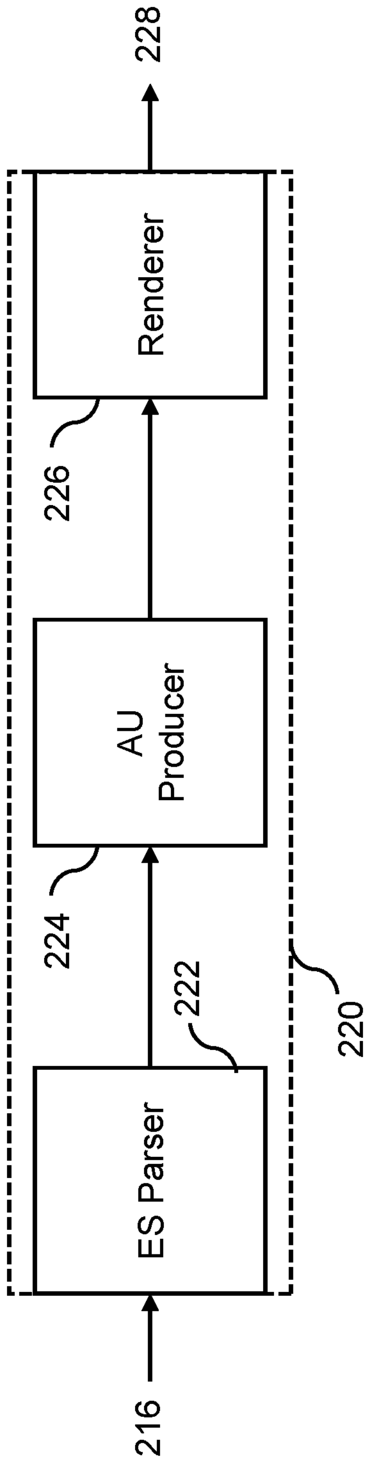
Figure 5:
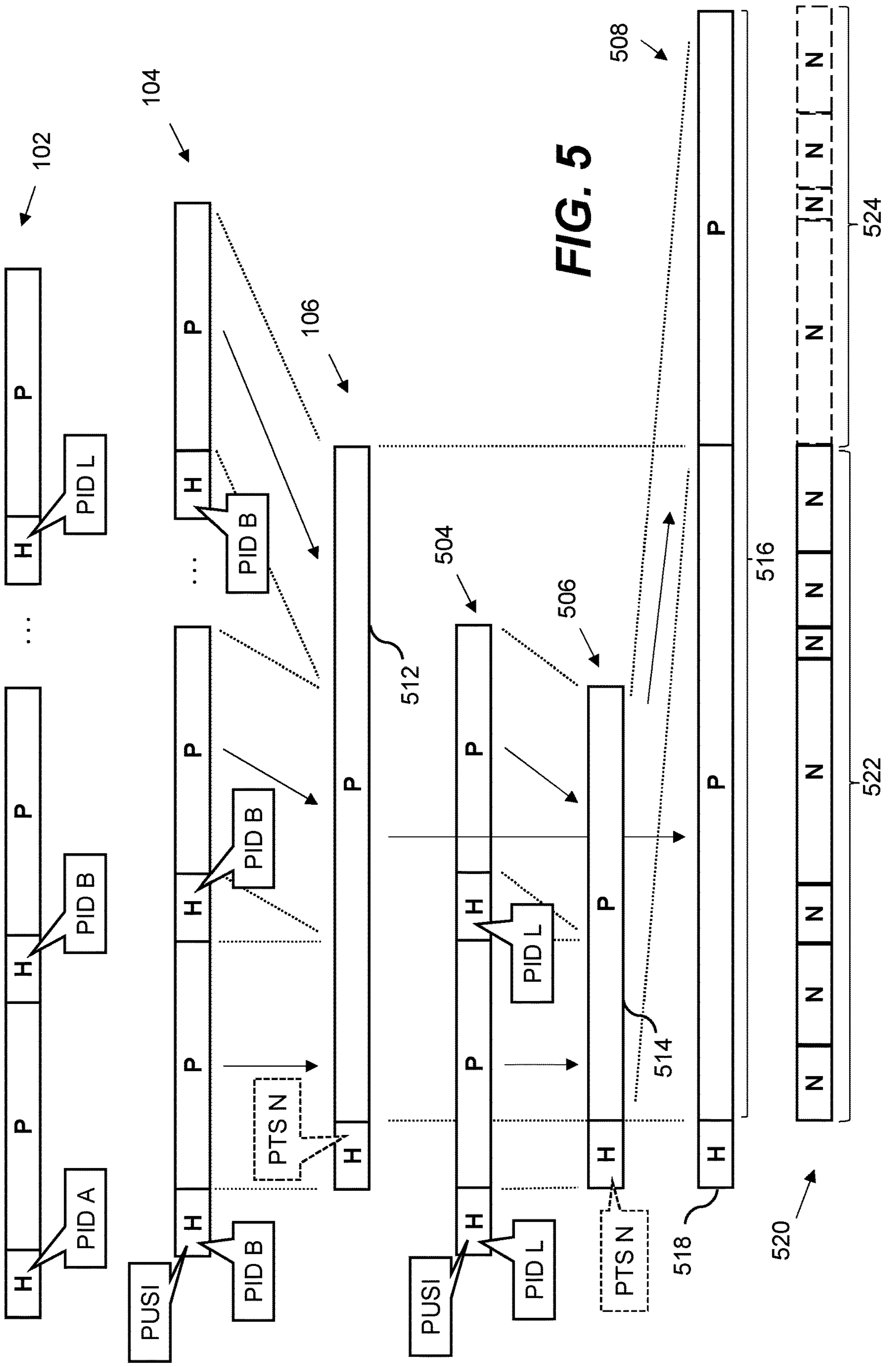
FIG. 5 is a schematic diagram showing an example of a joined packet stream.
Figure 6:
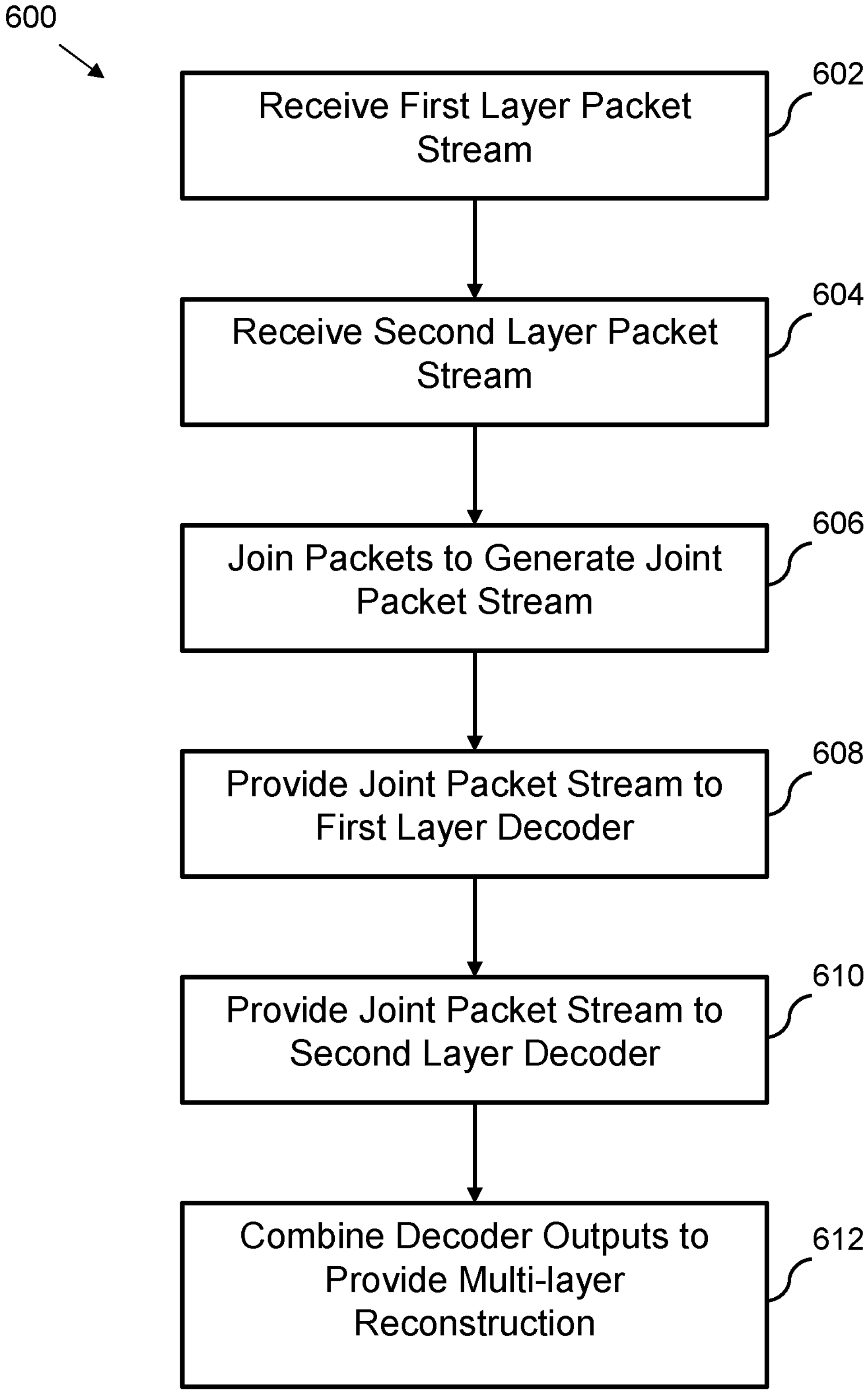
FIG. 6 is a flow diagram showing an example method of decoding a multi-layer video stream.
Figure 7:
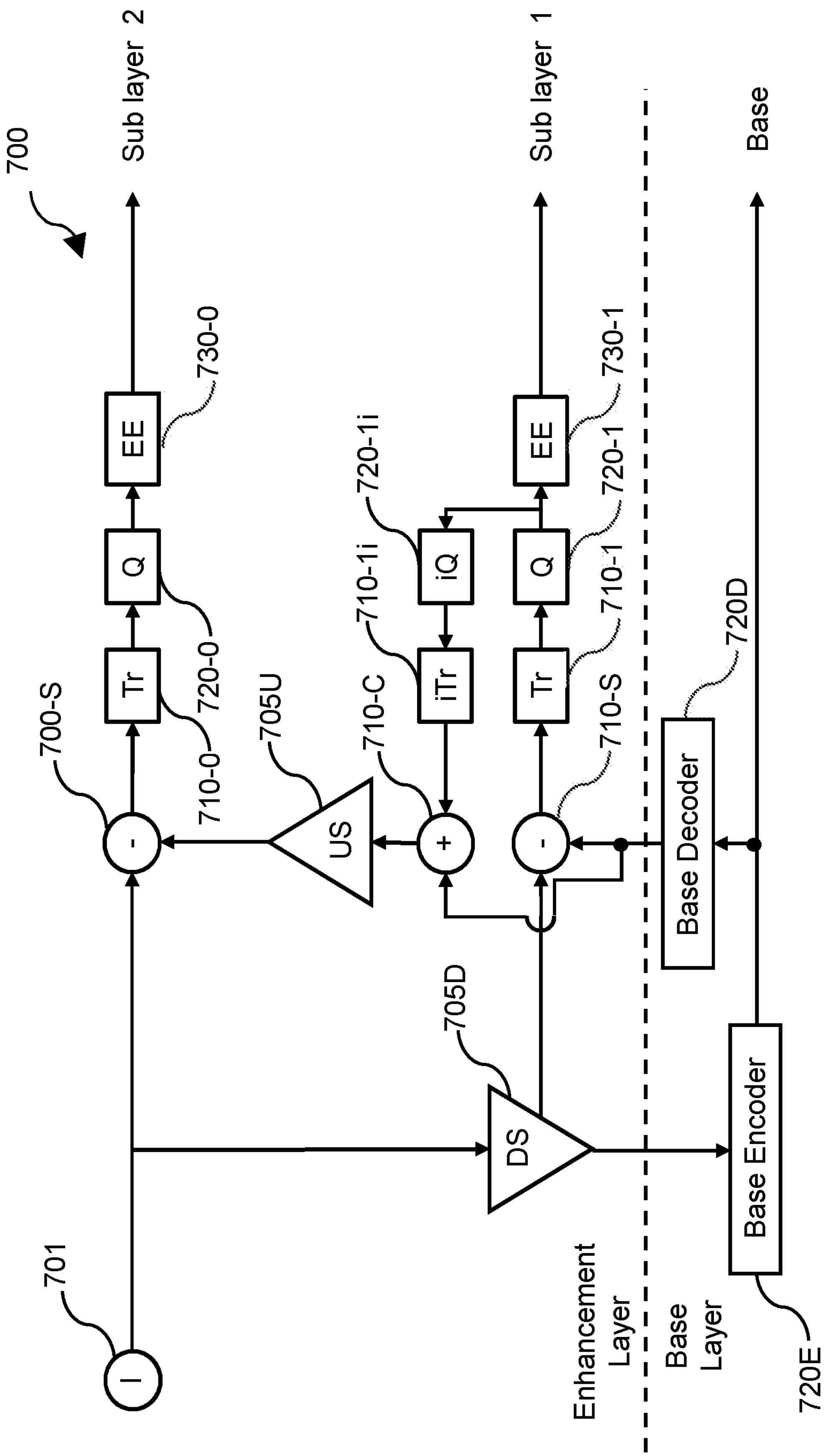
FIGS. 7 and 8 are schematic diagrams respectively showing an example multi-layer encoder and decoder configuration.
Figure 8:
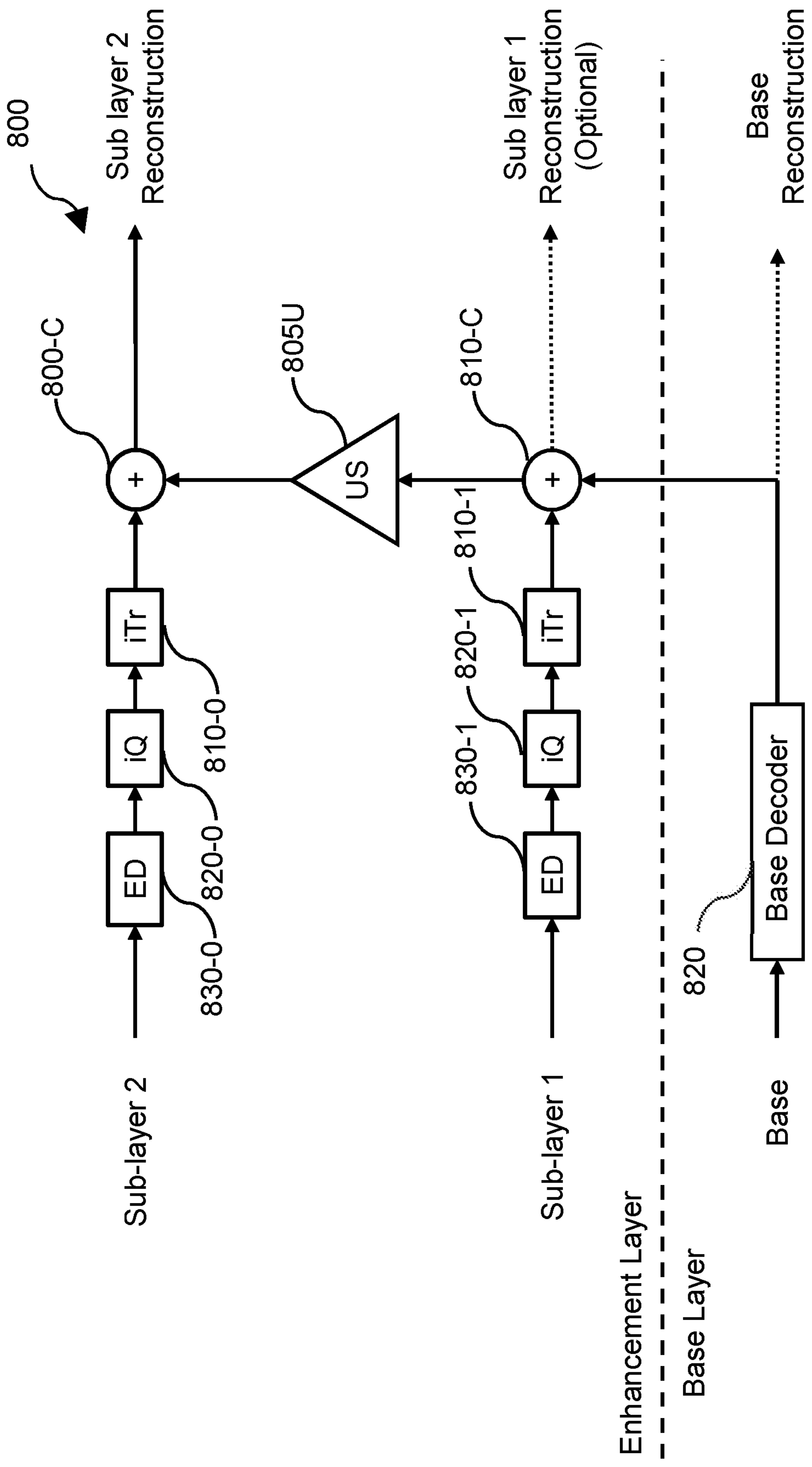
Figure 9:
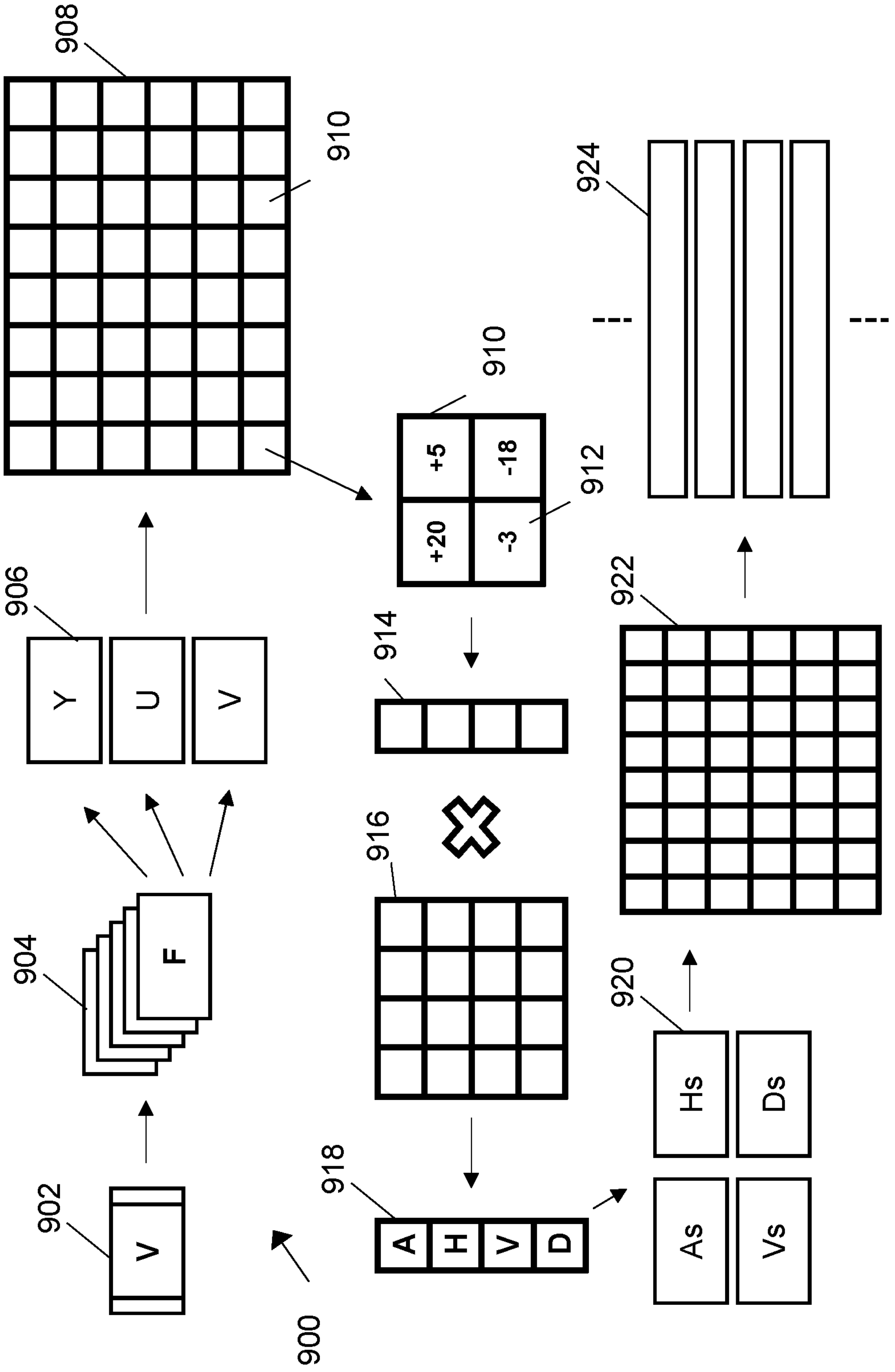
FIG. 9 is a schematic diagram showing certain data processing operations performed by an example multi-layer encoder.
Figure 10:
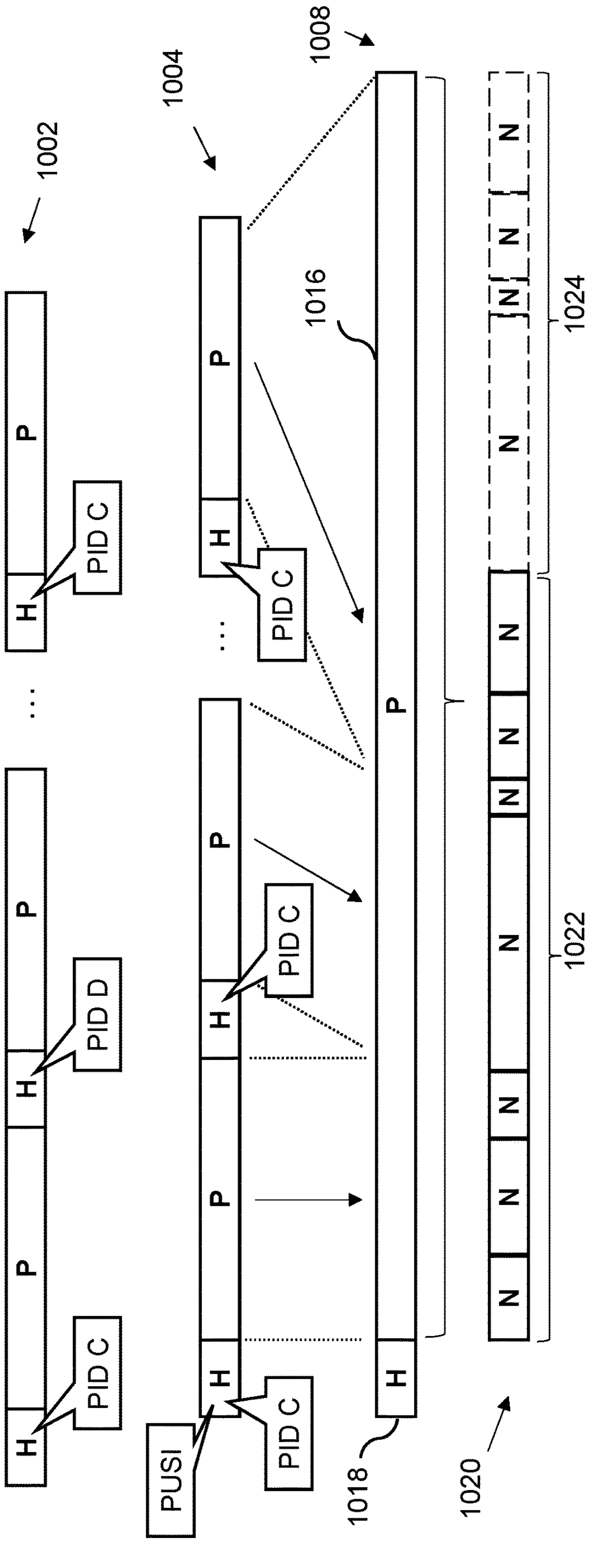
FIG. 10 is a schematic diagram showing a combined multi-layer stream as may be generated at an encoder for transmission to a decoder.
Figure 11:
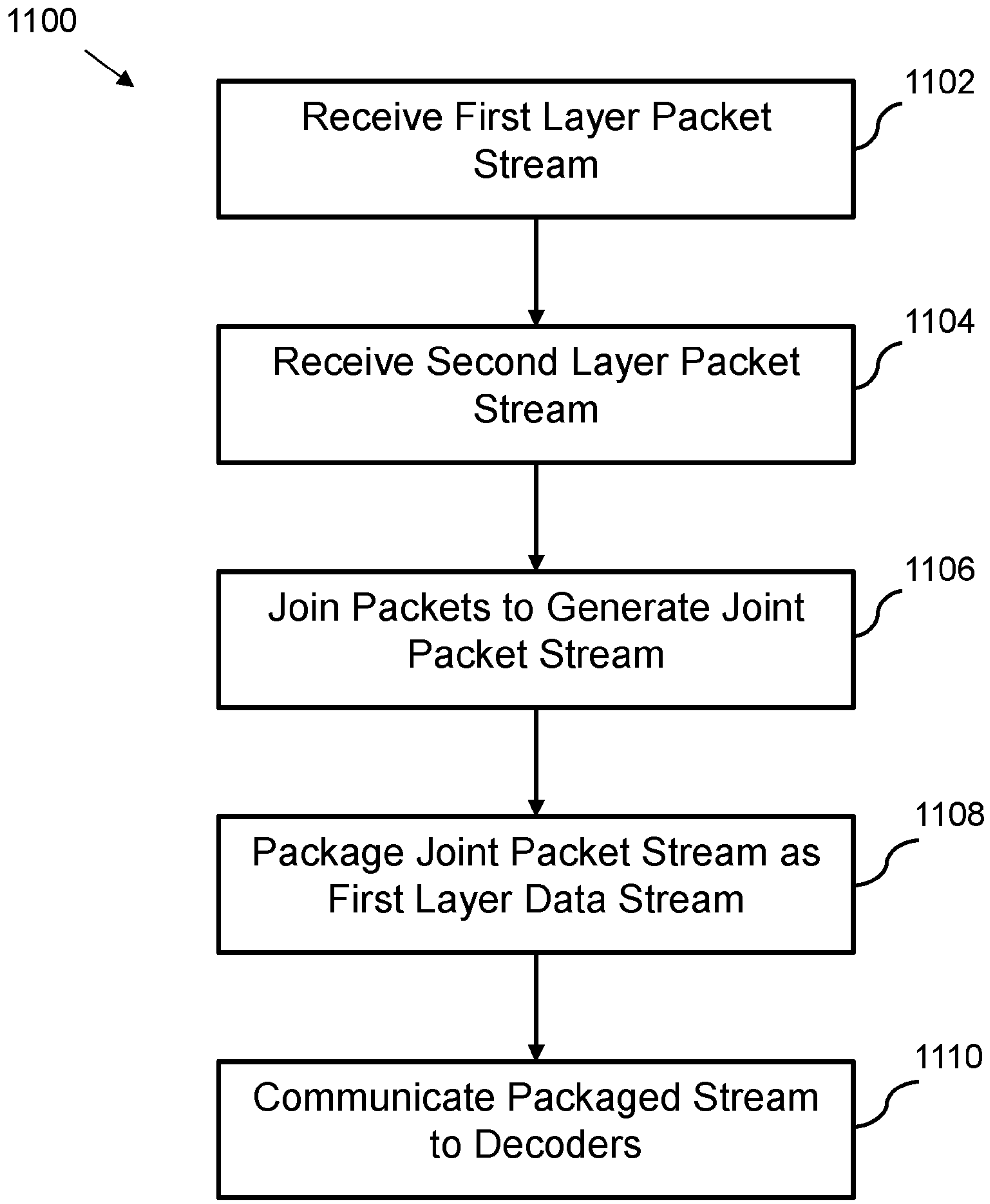
FIG. 11 is a flow diagram showing a method of joining different layer streams to form a multi-layer stream.
Figure 12:
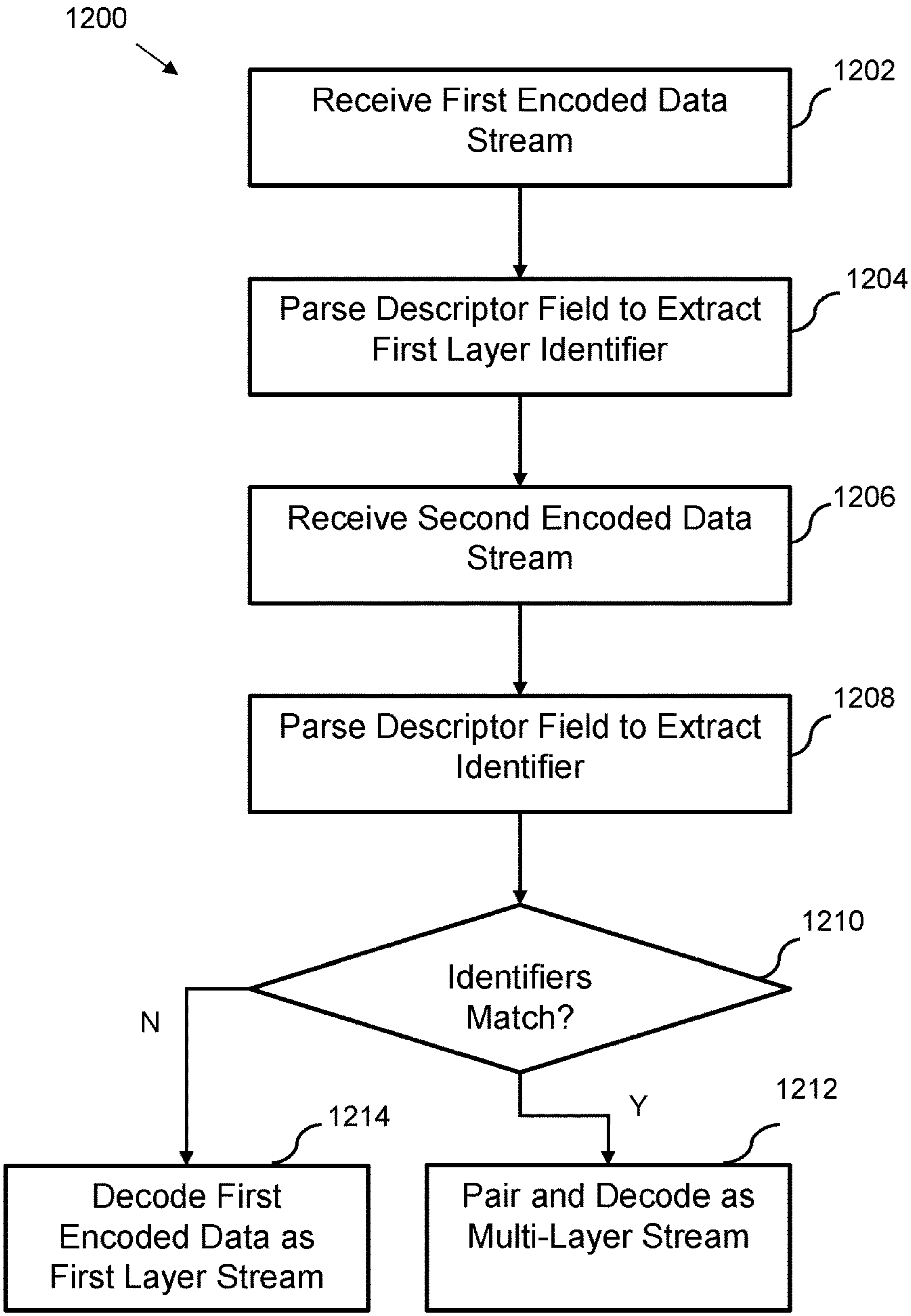
FIG. 12 is a flow diagram showing a method of linking different layer streams using metadata.

In the Figures, FIGS. 1 to 2C relate to comparative media decoding pipelines, FIGS. 3 to 6 set out particular examples of one improved decoding system and method, FIGS. 7 to 9 provide examples of a particular multi-layer video scheme that may be used with any of the described examples, FIGS. 10 and 11 show an alternative example where a joint elementary stream may be generated at an encoder, and FIG. 12 shows an example whereby aspects discussed herein may be adapted to tag different layers within single or multiple data streams.

In certain examples, such as those shown in FIGS. 1 to 6, different layers of a multi-layer video coding are transmitted as separate packets within a transport stream. This allows different layers to be effectively supplied separately and for enhancement layers to be easily added to pre-existing or pre-configured base layers. At a decoding device, different packet sub-streams are received and parsed, e.g. based on packet identifiers (PIDs) within packet headers. This may be performed by existing decoding pipelines that are configured to parse different single-layer encodings (e.g., non-scalable H.264 or H.265 streams).

A number of examples will now be described with reference to the accompanying Figures. FIGS. 1 to 2C relate to comparative media decoding pipelines whereas FIGS. 3 to 6 set out particular examples of an improved decoding system and method. FIGS. 7 to 9 then provide examples of a particular multi-layer video scheme that may be used with the examples of FIGS. 3 to 6.

FIG. 1 shows an example 100 of a Transport Stream (TS) 102 that may be used to transmit encoded video data to one or more decoding devices. The Transport Stream 102 comprises a sequence of fixed-length 188-byte TS packets 110. Each TS packet 110 has a header 112, which may have a variable length, and a payload 114. The header 112 includes one or more data fields. One of these data fields provides a Packet Identifier (PID) 116. The PID is used to distinguish different sub-streams within the Transport Stream. The PID may be a number of bits of a fixed length (e.g., 13 bits) that stores a numeric or alphanumeric identifier (typically represented as hexadecimal value). For example, the PID 116 may be used to identify different video streams that are multiplexed together into a single stream that forms the Transport Stream 102. An example Transport Stream specification is set out in MPEG-2 Part 1 and defined as part of ISO/IEC standard 13818-1 or ITU-T Rec. H.222.0.

FIG. 1 also shows a so-called PID stream 104 that may be extracted from the Transport Stream 102. The PID stream 104 comprises a stream of consecutive packets 110 that have a common (i.e., shared) PID value. The PID stream 104 may be created by demultiplexing the Transport Stream 102 based on the PID value. The PID stream 104 thus represents a sub-stream of the Transport Stream 102.

In certain cases, there may be special PID values that are reserved for indexing tables. In one case, one PID value may be reserved for a program association table (PAT) that contains a directory listing of a set of program map tables, a program map table (PMT) comprising a mapping between one or more PID values and a particular "program". Originally a "program" related to a particular broadcast program but with Internet streaming, the term is used broadly to relate to the content of a particular video stream. PMTs may provide additional metadata regarding content that is transmitted as part of a PID stream 104 within the Transport Stream 102. The PMT may comprise program descriptors. These are sets of bytes (multiples of 8-bits), where a length of the descriptors may be defined (e.g., a length may indicate that N descriptors follow, each of 8-bits). Descriptors may be provided for an entire MPEG-2 program or for individual elementary streams. They may be optionally provided, such that some elementary streams do not carry descriptors. In certain cases, descriptors may be provided generally as part of program-specific information (PSI), which comprises metadata for content that is supplied as part of a transport stream. In certain examples described later in this description, the descriptors may be used to pair different layers within a multi-layer stream without breaking backward decoding capabilities for lower layers.

FIG. 1 also shows a Packetised Elementary Stream (PES) 106 that is constructed based on the payload data of a plurality of TS packets 110. A PES comprises data from payloads of a PID stream that carries media sample data. Media sample data may comprise video data as well as other modalities, such as audio data, subtitle data, or volumetric data. In FIG. 1, a PES is generated by combining the payloads 114 of multiple media TS packets 110 that are associated with a common (i.e., shared) PID value. The PES comprises a packet stream where each PES packet consists of a header (i.e., a PES Header) 122 and a payload 124, the payload 124 carrying the combined data. The start of a new PES packet is indicated by a one-bit field from the TS header 112, called a Payload Unit Start Indicator (PUSI) 126. When the PUSI is set, the first byte of the TS packet payload 114 indicates where a new PES payload unit starts. This allows a decoding device that starts receiving data mid-transmission to determine when to start extracting data. The PES header 122 contains a Presentation Time Stamp (PTS) 128. This indicates a time of presentation for the corresponding piece of media encapsulated within the payload 124.

FIG. 1 lastly shows the contents of the PES payload 124 for a video stream. In this case, the PES payload 124 comprises a sequence 108 of NAL units 130 (i.e., a NALU stream). These may form part of an Access Unit for the video stream, i.e. a set of NAL units that are associated with a particular output time, are consecutive in decoding order, and contain a coded picture or frame. FIG. 1 shows a NALU stream 108 that may be provided to a suitable video decoder for decoding.

FIG. 1 shows how video streams may be broadcast (e.g., over the air or over a network) using transport streams. A number of file formats have also been defined for carrying encoded video streams. These include those based on the International Standards Organisation (ISO) Base Media File Format (BMFF) and those based on the Common Media Application Format (CMAF). The CMAF is an extensible standard for the encoding and packaging of segmented media objects for delivery and decoding on end user devices. The CMAF allows varying implementations such as HyperText Transport Protocol (HTTP) Live Streaming (HLS) and MPEG DASH (Dynamic Adaptive Streaming over HTTP). However, while file formats such as BMFF and CMAF were designed to help manage the complexity of video encoding formats, they were defined based on a single layer encoding framework (or in the case of SVC and SHVC, a monolithic scalable structure). These file formats were not defined to explicitly support multi-layer video encodings where different layers are generated using different encoding methods and decoded using different decoding methods. It is thus a challenge to support multi-layer video with these known file formats.

Both BMFF and CMAF define "containers", which are portions of the file structure that store encoded media data. Metadata for a container may define an encoding standard that has been used to generate the encoded media data. In one case, the file format may be defined in a file type field ("ftyp") at the beginning of the file that specifies the encoding format, e.g. "AVC1" for AVC or "HEVC" for HEVC. The file format may be parsed by a decoding device and used to activate a suitable decoder for the file format. This form of file format identification, however, requires a one-to-one mapping between the identified file format and the decoder implementation. While this works for monolithic scalable technologies such as SVC or SHVC, where a single decoder receives and decodes all the layers within a multi-layer video encoding, it does not work when different decoders are used for different layers (such as in LCEVC). It also causes problems with backwards compatibility. For example, a stream tagged as "SVC1" would be passed to an SVC decoder and would raise an error if an SVC1 decoder was not present, despite each layer within SVC being based on the AVC format.

In certain examples described herein a flexible method of decoding multi-layer video is provided. In these examples, a "nested" identifier is used to identifier encoded multi-layer video content within a file. The "nested" identifier operates as a valid identifier for at least one layer of the multi-layer video content (e.g., for a base layer). As such, even if decoders for one or more other layers of the multi-layer video content are not available, the at least one layer more be passed for decoding using an available first decoder (e.g., a legacy decoder) by parsing the nested identifier. In this case, data for the one or more other layers in the multi-layer video content may be ignored and only data for the at least one layer decoded using available decoders. However, if decoders for one or more other layers were available, these may be activated based on additional information derived from the nested identifier and passed at least the data for the one or more other layers. In certain cases, the data for all the layers are passed to each decoder and decoders are configured to ignore data that does not relate to their given layer (e.g., data tagged with values that are not recognised by a decoder may be ignored using default functionality of the decoder). In one case, the nested identifier may be implemented using the descriptor fields of a transport and/or elementary stream.

FIG. 2A shows an example of a comparative media playback pipeline 200 that may be used to decode and display media streams that are configured according to FIG. 1. The media playback pipeline 200 may form part of a client or decoding device such as a smartphone, laptop, smart television, or other media receiver and/or player.

In FIG. 2A, the stream receiver 210 receives stream data 205 from a source. Stream data 205 may be received over a communications network (e.g., as a received encoded stream) and/or may be received as a filesystem data stream (e.g., from memory, local storage, or a computer-readable medium). The term "stream" is used herein to refer to consecutive portions of data that are received or accessed. The stream receiver 210 in this example is configured to receive stream data 205 in the form of a container data stream such as a transport stream, similar to Transport Stream 102 in FIG. 1, or a digital multimedia container such as an MPEG-4 Part 14 (MP4) container. The stream receiver 210 is configured to detect a container type and then parse the stream data 205 based on the container type. For example, the stream receiver 210 may detect whether the stream data 205 is a transport stream or another MPEG container (such as an MP4 container) and then initiate an appropriate parser for the container type (e.g., a TS parser or MP4 parser). The stream receiver 210 may parse the stream data 205 to locate both media sample data and metadata within the stream data 205. For example, the metadata of a transport stream may comprise PAT data and/or PMT data that maps PIDs with data packet headers to programs and the metadata of an MP4 container may comprise a listing of "tracks" that are present within an MP4 file. The stream receiver 210 may thus conditionally parse the stream data 205 to identify metadata in the form of a "directory" identifying what packetised elementary streams (e.g., TS containers) or tracks (e.g., MP4 containers) are present.

Following the parsing of the stream data 205 by the stream receiver 210, the stream receiver 210 is configured to instantiate one or more decoders to decode the individual data streams contained within the stream data 205. FIG. 2A shows a plurality of video decoders 220-A to C and an audio decoder 240. Other decoders may also be provided, such as subtitle decoders. In the example of FIG. 2A, the stream receiver 210 may instantiate a particular decoder based on metadata carried in the stream data 205, such as metadata accompanying a particular PID stream such as PID stream 104 in FIG. 1 or a particular MP4 track. The stream receiver 210 may instantiate a particular decoder based on an identified stream type for a particular PID stream or MP4 type. For example, the stream receiver 210 may instantiate an H.264 video decoder for a PID stream identified as a H.264 video stream and an H.265 video decoder for a PID stream identified as a H.265 video stream. Audio streams that accompany a video stream (e.g., where the audio and video streams are multiplexed) may be identified and an audio decoder 240 instantiated based on the audio stream type. In one case, the stream receiver 210 may not directly instantiate a decoder but may pass a demultiplexed data stream for a program or track to an existing decoder, e.g. where the existing decoder may be determined based on the metadata carried in the stream data 205. Although only one audio decoder 240 is shown in FIG. 2A, multiple audio decoders may be provided in implementations (e.g., for different audio formats similar to the shown video decoder case). Similarly, other decoders such as subtitle decoders have been omitted for clarity but may also be instantiated in parallel with the shown video and audio decoders.

The video decoders 220 shown in FIG. 2A are configured to process a particular encoded video stream, such as PES 106 from FIG. 1 or a corresponding MP4 track, and output decoded video data ready for display. The audio decoder 240 performs a similar function with respect to an encoded audio stream to output encoded audio data for output. In FIG. 2A, the video decoders 220 provide their output to a display output compositor 230, which is configured to render the decoded video data on a display. The display may be an integrated display (such as a touchscreen of a smartphone) or a separate display (such as a monitor, headset, or projector). The audio decoder 240 provides its output to an audio mixer 250 for output of decoded audio data on an appropriate speaker device, such as headphones, integrated speakers, or an external sound system. In general, the decoded data may comprise frames of video data, audio samples, or subtitles for display over one or more frames, amongst others.

FIG. 2B shows two sub-components of the stream receiver 210 according to a particular example. In FIG. 2B, the stream receiver 210 comprises a container detector 212 and a stream parser 214. The container detector 212 is configured to detect the container type of the received stream data 205. For example, the received stream data 205 may comprise a stream of data received using a particular communication protocol over a network or a stream of data received from an operating system file system function. The container detector 212 may at least detect the container type of the stream data 205, e.g. whether the stream data 205 comprises a transport stream or another MPEG media container. The stream parser 214 receives the stream data 205 and the detected container type from the container detector 212. The stream parser 214 uses the detected container type to parse metadata carried within the stream data 205 (e.g., locate and extract a PAT for a transport stream or a track listing for an MP4 file) and to then instantiate suitable decoders as described in more detail below.

FIG. 2C shows three sub-components of a video decoder 220 according to a particular example. The audio decoder 240 and other decoder types may also have a similar form. The video decoder 220 in FIG. 2C comprises an Elementary Stream (ES) parser 222, an Access Unit (AU) producer 224, and a renderer 226. The elementary stream parsed by the ES parser 222 may be a Packetised Elementary Stream (PES) or a non-packetised elementary stream. The ES parser 222 is configured to receive an output 216 of the stream receiver 210 and to extract appropriate encoded media data from that output 216. In one case, the ES parser 222 receives the stream data 205 and a PID or track of interest from the stream parser 214. The PID of interest may comprise a particular program (i.e., particular video content) a user wishes to view. In this case, the ES parser 222 extracts or demultiplexes the identified program or track data streams, e.g. based on an identified PID or MP4 track. The ES parser 222 may thus extract PID stream 104 from a TS stream 102. In this case, the output 216 of the stream receiver 210 may comprise the stream data 205, which is passed to each decoder as a complete stream. In other cases, the stream parser 214 may perform extraction or demultiplexing prior to the ES parser 222, such that the output for a particular video decoder 220 comprises a single identified program or track data streams. The exact location of the extraction or demultiplexing may thus vary according to different implementations.

Once a particular PID stream or track is identified, the ES parser 222 is configured to process the data of that stream or track to provide encoded media data to the AU producer 224. This may comprise extracting data from the payloads of multiple TS packets 110 to form a PES 106 as shown in FIG. 1. PES 106 may then be passed to the AU producer 224. For container "tracks", a similar elementary stream may be generated from extracted track data. The AU producer 224 is then configured to parse the encoded media data at the access unit level. This may comprise extracting the actual sample data for passing to the renderer 226 for reconstruction of original signal data (such as a decoded frame of video). This may also comprise additional coding-scheme specific parsing of the PES 106 or track, such as extracting and parsing coding-scheme specific metadata. Coding-scheme specific metadata may comprise one or more of Sequence Parameter Set (SPS) data, Picture Parameter Set (PPS) data (e.g., for H.264 video), or Supplementary Enhancement Information (SEI) data. Coding-scheme specific metadata may be "in band", i.e. interleaved with the (media) sample data. In one case, media sample data may be extracted in the form of a sequence of NAL units 108 as shown in FIG. 1. This sequence of NAL units 108 may form the input to the renderer 226.

The renderer 226 is configured to decode the media sample data received from the AU producer 224 to produce a decoded medium 228 (e.g., a frame, a subtitle or an audio sample) ready to be output, e.g. on a display. The renderer 226 may comprise a specific codec or decoder, such as a H.264 or H.265 decoder (or an MP3/4 or Advanced Audio Coding—AAC decoder for audio data).

In the examples of FIGS. 2A to 2C, each video decoder 220 is implemented as a specific decoding pipeline that receives either a single demultiplexed stream or multiplexed data at the transport or container level, the latter being processed to extract a single demultiplexed stream. Each video decoder 220 comprises a coding-scheme-specific implementation, as at least the AU producer 224 and renderer 226 implement coding-scheme-specific parsing and decoding. Hence, in comparative examples, a stream receiver 210 may parse a PMT of a transport stream to enable extraction of a plurality of PES as shown in FIG. 1. The stream receiver 210 may create or instantiate a particular video decoder 220 to act as a PES parser based on a stream type and parsed elementary stream data (e.g., as determined by the container detector 212 and stream parser 214). In this case, the instantiated video decoder 220 reads the payload of the PES, e.g. according to a specific coding scheme, and an AU producer 224 of the video decoder 220 outputs (e.g., creates) a set of access units by parsing a sequence of NAL units. The access units may then be supplied as an input data source for a specific renderer. This process may form the basis of a media player that is implemented on a particular client device.

Within the context of the comparative examples of FIGS. 1 to 2C, FIGS. 3 to 6 provide examples of an improved system and method for decoding a multi-layer video stream. While the comparative examples of FIGS. 1 to 2C are suitable for decoding single layer media streams, such as conventional H.264 or H.265 data streams, it is not straightforward to adapt such frameworks to process multi-layer data streams, especially multi-layer data streams where each layer may be encoded using a different coding scheme. For example, SVC and SHVC are typically provided in the same form as their parent H.264 or H.265 single-layer schemes and are processed by a single SVC or SHVC video decoder as shown in FIG. 2A. In SVC and SHVC cases, the separate layers cannot be processed by separate video decoders (e.g., one layer processed by video decoder 220-A and another layer processed by video decoder 220-B) as the efficiencies of the schemes are based on SVC and SHVC specific intra-layer information. As such, SVC and SHVC streams need to be decoded by a single decoder unit that has access to this internal information.

With newer multi-layer video coding schemes, such as LCEVC, it is becoming possible to have a multi-layer coding scheme where different layers within the coding scheme are encoded according to different coding standards. For example, an LCEVC data stream may comprise a lower resolution H.264, H.265, or Versatile Video Coding (VVC) "base" layer stream and an LCEVC-specific "enhancement layer" stream, where the LCEVC-specific "enhancement layer" stream may in turn comprise different sub-layers. The "base" layer stream may thus take a variety of forms and may comprise pre-existing and/or independent streams, e.g. a video distributer may provide an LCEVC-specific "enhancement layer" stream "on top of" an existing and/or independent "base" layer stream. In LCEVC, the sub-layers comprise encoded residual data for application to a decoded output of the "base" layer stream.

Figure 3:
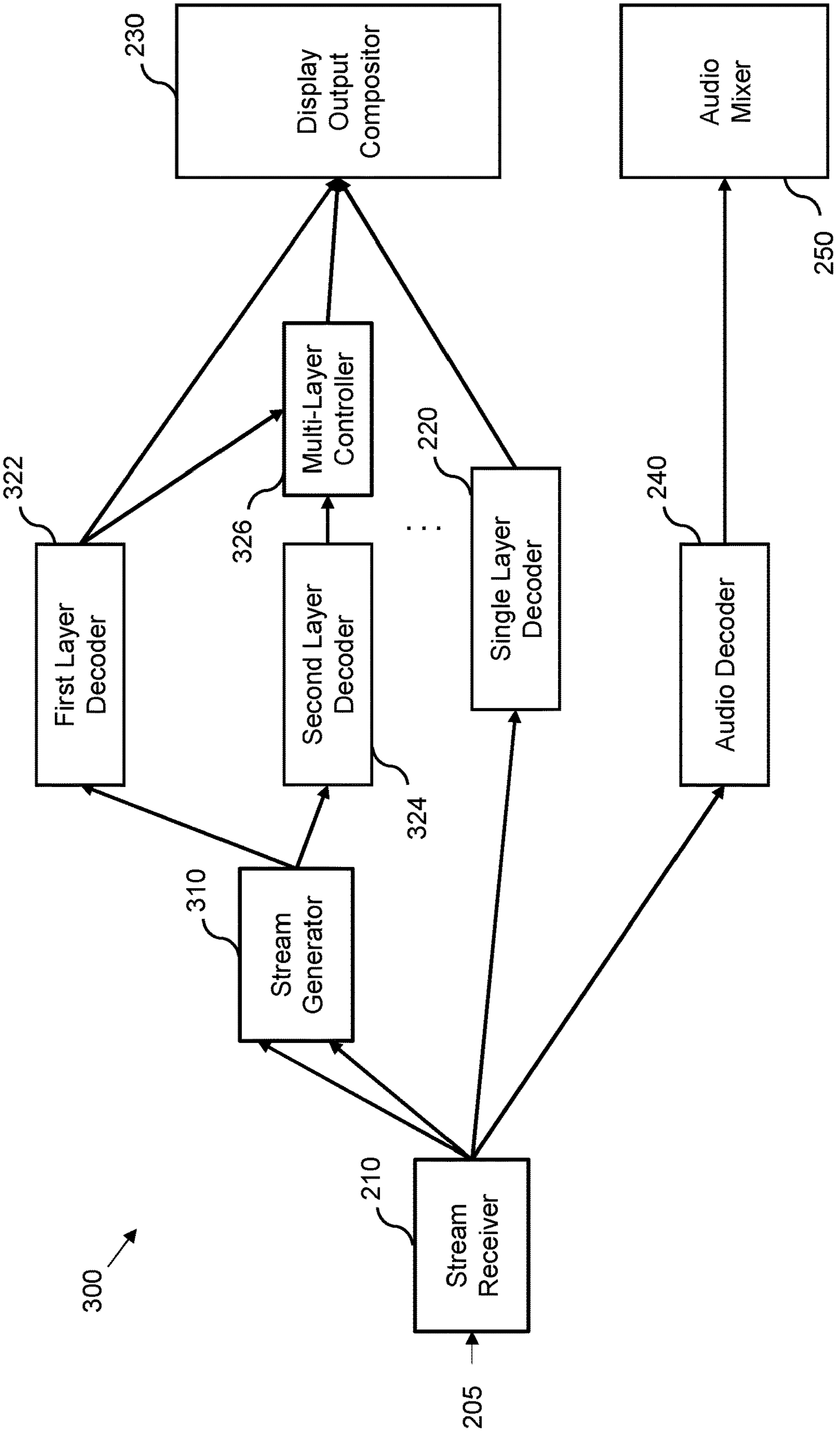
FIG. 3 is a schematic diagram showing an example system for efficiently decoding multi-layer encoded video data.

FIG. 3 shows an example 300 that provides an efficient decoding of a multi-layer video stream, where different layers may be encoded according to different coding formats. The example 300 of FIG. 3 may be seen as an adaptation or extension of the example 200 of FIG. 2A. Components with functions as described with reference to FIG. 2A are provided with corresponding reference numbers in FIG. 3. FIG. 3 shows a first example where different layers of a multi-layer stream that are received as separate elementary streams may be combined at a decoding device to form a joint elementary stream that may be passed to multiple layer decoders. This is one possible solution. Other alternative solutions are described later, e.g. with reference to FIG. 11. In these later cases, the joint elementary stream may be generated at an encoder or transmitter of the transport stream, and transmitted as a single elementary stream, e.g. with a PID for a first layer.

Turning to the example of FIG. 3, this shows a stream receiver 210 that receives stream data 205 as described with reference to FIG. 2A. In FIG. 3, an audio decoding pipeline may be implemented as shown in FIG. 2A, e.g. via audio decoder 240 and audio mixer 250. The audio decoding pipeline may be used to decode and output one or more audio streams or tracks corresponding to a decoded video stream. FIG. 3 also shows a display output compositor 230 for the display of decoded video data as per FIG. 2A. In the example 300 of FIG. 3, the arrangement of video decoders 220 in FIG. 2A are modified to provide the efficient decoding of a multi-layer video stream. In this context, certain existing single-layer video decoders 220 that are not used by the multi-layer video stream may be implemented as described with reference to FIG. 2A. This minimises the changes to existing media players. However, to provide the decoding of the multi-layer video stream, the example 300 of FIG. 3 shows a stream generator 310, a first layer decoder 322, a second layer decoder 324, and a multi-layer controller 326. Components shown in FIG. 3 may form part of a video decoder, such as a client device implementing a media player.

The stream receiver 210 in the example 300 performs functions similar to the stream receiver 210 described with reference to FIGS. 2A and 2B. In the present example 300, the stream receiver 210 coordinates receipt of first and second packet sub-streams corresponding to first and second layers of a multi-layer video encoding. For example, the first and second packet sub-streams may be received as part of a transport stream such as Transport Stream 102 of FIG. 1 or FIG. 5 or as part of another digital multimedia container, such as different MP4 tracks. The first and second packet sub-streams may be multiplexed within stream data 205. FIG. 5 shows a first packet sub-stream 104 in the form of a PID stream with a first PID (PID "B" in FIG. 5). FIG. 5 also shows a second packet sub-stream 504 in the form of a PID stream with a second PID (PID "L" in FIG. 5). The stream receiver 210 may receive the two sub-streams multiplexed in Transport Stream 102 as shown in FIG. 5. As per FIG. 1, in the present example and as shown in FIG. 5, each packet of the first and second packet sub-streams comprises a header 112 and a data payload 114. The first packet stream is identified via a first packet identifier indicated in the header (e.g., PID "B") and the second packet stream is identified via a second packet identifier indicated in the header (e.g., PID "L"). In this example, the identifiers "B" and "L" may refer respectively to "base" and "LCEVC" layers of a multi-layer stream. Although an example is presented here with reference to multiple PID streams, in alternative examples, the stream receiver 210 may be adapted to extract multiple encoded data streams according to other approaches, including based on tags or identifiers in elementary streams.

In the example of FIG. 3, the stream generator 310 receives the first and second packet sub-streams and is configured to generate a joint elementary packet stream from the sub-streams. In one case, the stream generator 310 may receive the first and second packet sub-streams as separate packet sub-streams. In this case, it may be desired to view a multi-layer stream that is indicated by a highest layer stream, e.g. the "L" PID stream 504. In this case, a user may select a program associated with the "L" PID stream 504. This may be identified as an "enhanced" version of the "B" PID stream 104. The stream receiver 210 may first determine the content type of, and extract metadata from, the selected "L" PID stream 504. The extracted metadata may then comprise a reference to the PID of the "B" PID stream 104 (e.g., header data for the "L" PID stream 504 may identify the base PID as "B"). The stream receiver 210 may then be configured to also determine the content type of, and extract metadata from, the determined "B" PID stream 104. In another case, a user may select a program associated with the "L" PID stream 504 and the PID and an output from the stream receiver 210 for this stream may be passed, together with the transport stream, to the stream generator 310. The stream generator 310 may then be configured to determine the lower level (e.g., base) PID stream associated with the higher level (e.g., enhancement or LCEVC) stream and demultiplex both PID streams accordingly. In both cases, the stream generator 310 ends up with two packet sub-streams in the form of the "B" and "L" PID streams.

In the present example 300, the stream generator 310 takes the two packet sub-streams and generates a joint elementary packet stream comprising a sequence of packets comprising data for both the first and the second layers. The joint elementary packet stream may comprise a joined PES 508 as shown in FIG. 5, wherein a PES payload 512 for the first layer (e.g., the "B" base layer) is extracted together with a PES payload 514 for the second layer (e.g., the "L" enhancement layer). In this case, the PES payload 512 for the first layer and the PES payload 514 for the second layer are arranged as a payload 516 for the PES joined stream 508. The PES joined stream 508 also comprises a PES header 518. Hence, the PES joined stream 508 appears as a normal PES such as PES 106 in FIG. 1. As shown in FIG. 5, the joint elementary packet stream may be made up of a sequence of NAL units 520 in a similar manner to NALU stream 108 in FIG. 1; however, in the present case, the NAL units 520 comprise a first sequence of NAL units 522 for the first layer and (e.g., concatenated with) a second sequence of NAL units 524 for the second layer.

Returning to FIG. 3, the stream generator 310 provides the same joint elementary packet stream to both the first layer decoder 322 and the second layer decoder 324. The stream generator 310 outputs the joint elementary packet stream in a normal elementary packet stream format (e.g., as a PES). Hence, the first layer decoder 322 and the second layer decoder 324 may be configured to receive an input of the same format as the video decoders 220 in FIG. 2A, only in the present case the decoders receive additional data in the form of the joined stream.

The first layer decoder 322 is configured to receive the joint elementary packet stream generated by the stream generator and to output a decoding of the data for the first layer within the joint elementary packet stream. The first layer decoder 322 may comprise a normal single layer decoder (e.g., a H.264 or H.265 decoder). In this case, NAL units for the second layer in the joint elementary packet stream, such as NAL units 524 in FIG. 5, may comprise a NAL unit type field in a header of each NAL unit. This NAL unit type field may be set as a reserved value (such as 28 to 30), wherein the first layer decoder 322 may be configured to ignore NAL units within a reserved range (e.g., 28 and above). For example, decoding devices that comply with the H.264 or H.265 standards, amongst others, are configured to ignore NAL units that contain header data that is outside specified value ranges defined within those standards. In other cases, other NAL unit fields may be set to indicate that the NAL units 524 are to be ignored when processing the first layer. With regard to LCEVC, further details may be found in section 7.4.2.2 of the LCEVC standard (ISO/IEC FDIS 23094-2:2021), which is incorporated herein by reference. The first layer decoder 322 thus processes the data contained with the first sequence of NAL units 522 in a similar manner to the original sequence of NAL units 108 shown in FIG. 1. The decoding of the data for the first layer may comprise a decoded picture or frame for the first layer, such as a H.264, H.265 or VVC decoded frame.

The second layer decoder 324 also receives the joint elementary packet stream generated by the stream generator 310. The second layer decoder 324 decodes the data for the second layer, e.g. the data contained in NAL units 524, to output a decoding of the data for the second layer within the joint elementary packet stream. In the examples described herein, the second layer decoder 324 is different to the first layer decoder 322. For example, the first layer decoder 322 may be a legacy hardware and/or software video decoder that complies with a first video coding standard (e.g., H.264, H.265, VVC etc.) and the second layer decoder 324 may be an enhancement hardware and/or software video decoder that complies with a second, different video coding standard (e.g., LCEVC). The second layer decoder 324 may decode a residual signal whereas the first layer decoder 322 may decode a video (non-residual) signal. The residual signal may comprise a plurality of sub-layers representing different levels of quality (e.g., different spatial resolutions).

In the present example, the multi-layer controller 326 is communicatively coupled to the first layer decoder 322 and the second layer decoder 324. The multi-layer controller 326 is configured to combine an output of the first layer decoder 322 and an output of the second layer decoder 324 to provide a multi-layer reconstruction of the video signal. Although shown as a separate component, in certain implementations the multi-layer controller 326 may form part of the second layer decoder 324. For example, an enhancement decoder may comprise a second layer decoder in the form of a residual decoder and a controller to apply decoded residual data to a decoded frame of video from the first layer decoder

322. The multi-layer controller 326 may receive the output of the first and second layer decoders 322, 324 directly or indirectly. In the latter case, the multi-layer controller 326 may have access to a shared memory where decoded output of one or more of the first and second layer decoders 322, 324 is available. The shared memory may comprise a frame buffer than contains one or more frames as they are decoded. In an LCEVC case, the first layer decoder 322 may comprise a base decoder that outputs a lower quality picture or frame, e.g. a lower resolution frame, and the second layer decoder 324 may comprise an LCEVC decoder that receives and decodes residual data for a higher quality picture or frame, e.g., at a higher resolution. In this case, the multi-layer controller 326 may be configured to upsample the output of the first layer decoder 322 and apply one or more sub-layers of residual data. In one configuration, the multi-layer controller 326 may apply a first sub-layer of decoded residual data to the output of the first layer decoder 322, upsample the result, and then apply a second sub-layer of decoded residual data before outputting the multi-layer reconstruction of the video signal at the upsampled resolution. In LCEVC, the sub-layers and upsampling operations may be flexibly configured and so different multi-layer reconstruction configurations are possible. Generally, multiple sub-layers of the second layer may be decoded, possibly in parallel, by a common (e.g., single) second layer decoder.

In the example 300 of FIG. 3, the first layer decoder 322 provides a decoded output to the display output compositor 230 as per the video decoders 220 of FIG. 2A. This output may be at a lower level of quality, e.g. a frame of video data at a reduced resolution or encoding quality (e.g., high quantisation for a lower bit rate). However, it is still viewable as per the video decoding shown in FIG. 2A. An accompanying audio stream may also be decoded by the audio decoder 240 and output by the audio mixer 250 as described with reference to FIG. 2A. In FIG. 3, the multi-layer reconstruction output by the multi-layer controller 326 is also available to the display output compositor 230. The multi-layer reconstruction may be an improved or enhanced version of the output of the first layer decoder 322. For example, it may comprise a higher resolution version of this output or a version with finer detail and fewer compression artifacts. The multi-layer reconstruction may thus be viewed on a display device as a sequence of decoded frames.

In certain examples, the stream receiver 210 may comprise a demultiplexer to receive and demultiplex a multiplexed transport stream comprising a first packet sub-stream and a second packet sub-stream, e.g. Transport Stream 102. The data payloads of the first packet sub-stream may form a first packetized elementary stream (i.e., a first PES) and the data payloads of the second packet sub-stream may form a second packetized elementary stream (i.e., a second PES), wherein a joint elementary packet stream is generated that comprises a third packetized elementary stream (i.e., a joined PES) with a header comprising a presentation time stamp, the data payload following the header comprising data payloads from the first and second packetized elementary streams that are associated with the presentation time stamp. In certain cases, the first and second packet sub-streams may be transmitted such that the data payload of the second packet sub-stream arrives no later than the data payload of a corresponding portion of the first packet sub-stream. This may assist in synchronising the two PID streams.

Figure 4:
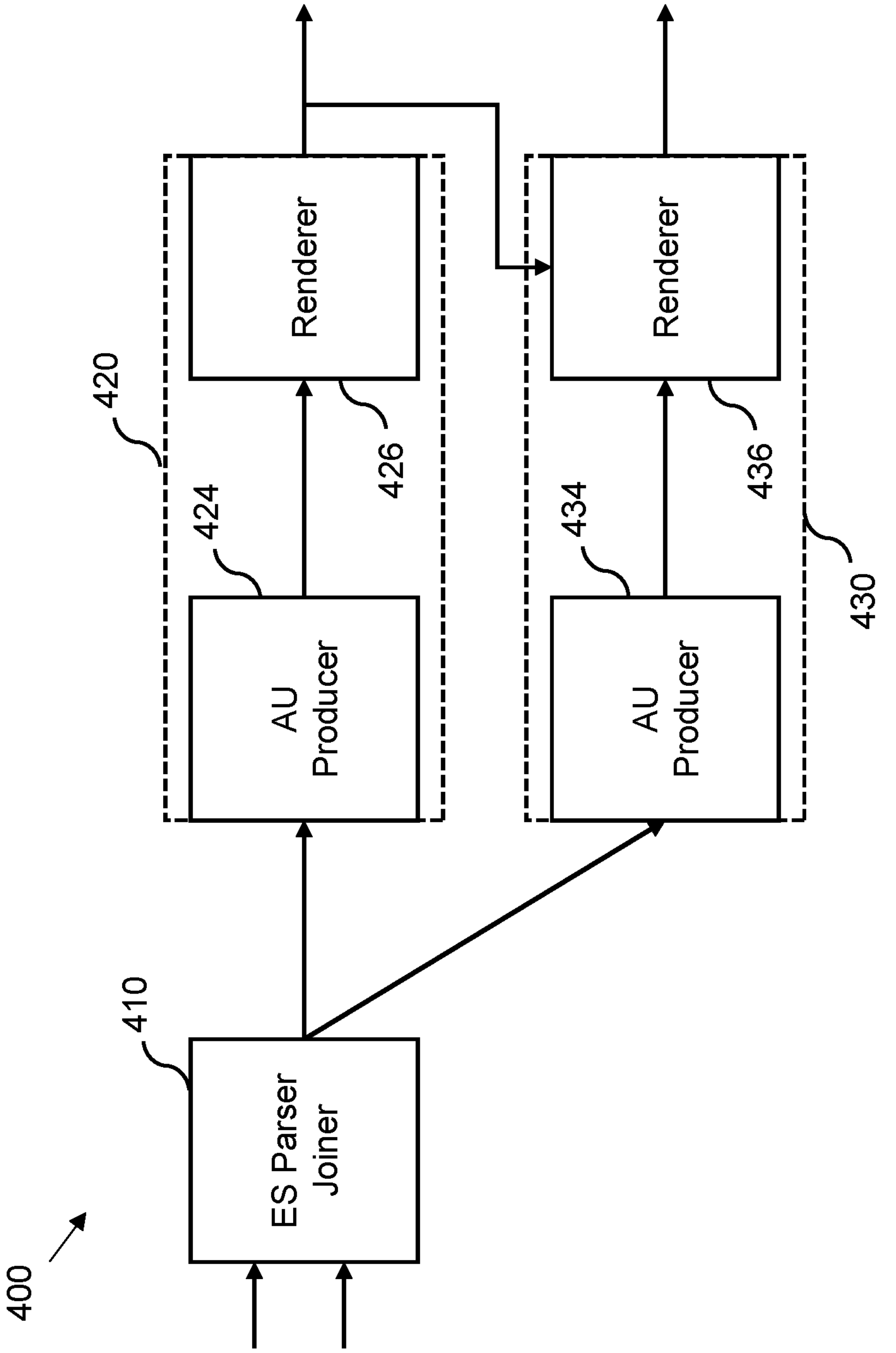
FIG. 4 is a schematic diagram showing a set of example components for efficiently decoding multi-layer encoded video data.

FIG. 4 shows another example 400 of how the components of FIG. 2C may be adapted to allow efficient decoding of a multi-layer video stream. FIG. 4 shows an Elementary Stream (ES) Parser Joiner 410 the supplies stream data to a first decoder 420 and a second decoder 430. As per the example 300, in the example 400 of FIG. 4 a solution with a dual PID joiner is adopted. The ES Parser Joiner 410 is fed with multiple PES or PID streams and outputs a single PES whose payload comprises the juxtaposed payloads of the multiple streams. This single PES is supplied to a downstream decoding chain comprising the components of the first decoder 420 and the second decoder 430. Both decoders comprise an AU producer and a renderer in series, similar to the example video decoder 220 of FIG. 2C. In this case, the ES Parser Joiner 410 replaces the separate ES Parsers 222 of the individual video decoders. The first decoder 420 comprises a first AU producer 424 and a first renderer 426. The second decoder 430 comprises a second AU producer 434 and a second renderer 436. The first decoder 420 may reuse the AU producer 224 and the renderer 226 shown in FIG. 2C to provide a decoded video output (e.g., a decoded frame of video) as described with reference to FIG. 2C. In one case, the first AU producer 424 receives the single PES with the joint payloads and processes the payload data to generate an access unit from the sequence of NAL units. As the first AU producer 424 may be configured based on legacy or known video decoding standards it may ignore the second sequence of NAL units 524 as shown in FIG. 5 when producing the access unit. In short, the first AU producer 424 may behave in same way as if the payload was originally from a single PID stream.

In FIG. 4, the second decoder 430 is then configured to decode an enhancement to the output the first decoder 420. In this example, the second decoder 430 incorporates features of the multi-layer controller 326 as part of the renderer 436. The second AU producer 434 is configured to generate an access unit comprising the second sequence of NAL units 524 for supply to the second renderer 436 for decoding. The second renderer 436 receives the output of the first decoder 420, decodes the enhancement carried within the access unit, and then combines the output and the enhancement to output an enhanced video for display. The first renderer 426 may thus form a first layer renderer to render an output of a first layer decoder on a display device and the second renderer 436 may form a multi-layer renderer to render a multi-layer reconstruction on the display device.

As described above, FIG. 5 illustrates the process of joining two PID streams or a first and second PES. A multiplexed Transport Stream 102 is shown as per FIG. 1. The Transport Stream 102 comprises multiple different PID sub-streams, including a base "B" PID stream 104 and an enhancement or LCEVC "L" stream 504. FIG. 5 shows the two PID streams 104, 504 following demultiplexing. FIG. 5 also shows the result of processing the two PID streams to generate separate PES (i.e., separate Packetised Elementary Streams). This may comprise combining the payloads of multiple TS packets with a common PTS value (shown in FIG. 5 as PTS "N"). The PTS may also be used to synchronise the two PID streams, e.g. the shown PES headers of "B" PES 106 and "L" PES 506 both have corresponding PTS values. FIG. 5 then shows a generated joint elementary packet stream (e.g., a joined PES) with the PES header 518 from PID "B" and the payload 512 from PID "B" followed by the payload 514 of PID "L". This joint elementary packet stream 508 forms an access unit for both layers of the multi-layer coding, with a first sequence of NAL units 522 containing the first layer encoded data and a second sequence of NAL units 524 containing the second layer encoded data.

FIG. 6 shows a method 600 of decoding a multi-layer video stream according to an example. The method 600 may be implemented by the systems 300 or 400 of FIG. 3 or 4 or upon another decoding system. In the present example, the multi-layer video stream encodes a video signal and comprises at least a first layer and a second layer. The first layer may be a normal single layer video stream, e.g. an H.264, H.265 or VVC stream at a predefined resolution and/or bit rate. The second layer may comprise an enhancement layer that is encoded using a different encoding method, such as a hierarchical residual encoding. The second layer may comprise an LCEVC stream.

At block 602, the method 600 comprises receiving a first packet sub-stream for the first layer. This first packet sub-stream may be a PID stream or PES such as PID stream 104 or PES 106 in FIG. 5. If the first packet sub-stream is a PID stream, each packet of the first packet sub-stream comprises a header and a data payload. The first packet sub-stream is identified via a first packet identifier (e.g., a PID) indicated in the header. The first packet sub-stream may be received as part of a digital multimedia container, such as a transport stream.

At block 604, the method 600 comprises receiving a second packet sub-stream for the second layer. This second packet sub-stream may be a PID stream or PES such as PID stream 504 or PES 506 in FIG. 5. If the second packet sub-stream is a PID stream, each packet of the second packet sub-stream comprises a header and a data payload. The second packet sub-stream is identified via a second packet identifier (e.g., a PID) indicated in the header. The second packet sub-stream may be received as part of a digital multimedia container, such as a transport stream. The digital multimedia container may be the same or different to the digital multimedia container that contains the first packet sub-stream. In one case, both the first packet sub-stream and the second packet sub-stream are received as part of a common (i.e., shared and single) transport stream as illustrated in FIG. 5. Blocks 602 and 604 may be performed by one or more of the stream receiver 210, the stream generator 310, and the ES Parser Joiner 410 of the previous examples.

At block 606, the packets from the first packet sub-stream and the second packet sub-stream are joined to generate a joint elementary packet stream. The joint elementary packet stream comprises a sequence of packets comprising data for both the first layer and the second layer. These packets may be NAL units, such as NAL units 522 and 524 in FIG. 5. They may be encapsulated within a single PES such as PES 508 in FIG. 5.

At block 608, the joint elementary packet stream is provided to a first layer decoder for decoding of the data for the first layer within the joint elementary packet stream. This may comprise decoding data for the first layer using a H.264, H.265, or VVC decoder. The first layer decoder may ignore packets comprising data for the second layer. The first layer decoder may comprise the first layer decoder 322 of FIG. 3 or the first decoder 420 of FIG. 4.

At block 610, the joint elementary packet stream is also provided to a second layer decoder for decoding of at least the data for the second layer within the joint elementary packet stream. The second layer decoder may comprise the second layer decoder 324 of FIG. 3 of the second decoder 430 of FIG. 4. Blocks 608 and 610 may be performed in parallel. In preferred examples, the first layer decoder differs from the second layer decoder. For example, the second layer decoder may comprise an LCEVC decoder.

At block 612, the method 600 comprises combining an output of the first layer decoder and an output of the second layer decoder to provide a multi-layer reconstruction of the video signal. For example, this may be performed by the multi-layer controller 326 of FIG. 3 or the second renderer 436 of FIG. 4. The multi-layer reconstruction may comprise an enhanced or augmented version of a reconstruction output by the first layer decoder at block 608. The method may be repeated on a frame-by-frame basis, where different colour planes may be processed in series or parallel per frame. The result may be an enhanced or augmented video that is rendered on a display for viewing.

In one case, the data payloads of the first packet sub-stream form a first packetized elementary stream (i.e., a first PES) and the data payloads of the second packet sub-stream form a second packetized elementary stream (i.e., a second PES). The joint elementary packet stream thus then comprises a third packetized elementary stream (i.e., a third PES). The third packetized elementary stream has a header comprising a presentation time stamp (PTS), and a data payload following the header (i.e., a payload of the third PES) comprises data payloads from the first and second packetized elementary streams that are associated with the presentation time stamp. In this case, the presentation time stamp is used to sync data for a particular picture or frame. In one case, the first and second packet sub-streams may be transmitted such that the last packet in the second packet sub-stream arrives no later than the last packet in the first packet sub-stream. In this manner, data for all the layers of the multi-layer encoding for a given picture or frame is available at a decoder to be synchronised, decoded, and combined as described.

A payload of the joint elementary packet stream may comprise a sequence of network abstraction layer (NAL) units for the first layer and a sequence of NAL units for the second layer. The first layer decoder may be configured to ignore the network abstraction layer units for the second layer based on unit type data values within a header of the network abstraction layer units for the second layer.

An output of the first layer decoder may be renderable independently of the multi-layer reconstruction of the video signal. For example, it may be possible to view both the output of the first layer decoder and the multi-layer reconstruction of the video signal. In certain cases, a displayed video rendering may switch between the two outputs based on the availability of the second packet sub-stream. The first layer may comprise a "base" video stream and the second layer may comprise a corresponding "enhancement" video stream. The base video stream may have first encoding parameters and the enhancement video stream may have second encoding parameters. In one case, the multi-layer reconstruction of the video signal comprises a higher quality rendition of a base video signal decoded from the base video stream. For example, the first packet sub-stream may represent a video encoding at a first resolution, such as a High Definition (HD) H.264 encoding, and the second packet sub-stream may represent an enhancement encoding at a second higher resolution, such as an Ultra-HD (UHD) LCEVC encoding. As well as different resolutions, the two packet sub-streams may also represent encodings at one or more of: different bit rates, different colour depths, different quantisation configurations, and different bit depths.

In one case, the method 600 further comprises receiving a multiplexed transport stream comprising the first packet sub-stream and the second packet sub-stream and demultiplexing the multiplexed transport stream to extract the first packet sub-stream and the second packet sub-stream. For example, this may be performed by one of the stream receiver 210, the stream generator 310, and the ES Parser Joiner 410 of the previous examples.

In certain examples, data for the second layer comprises frames of residual data that are combined with frames of the base video signal as decoded from the base video stream. For example, the second layer may comprise a Low Complexity Enhancement Video Coding (LCEVC) video stream. In certain cases, the second layer may comprise a watermarking stream, e.g. a stream with data to be added to an original video stream to visibly or invisibly mark, identify or secure the original video stream. In this case, the second layer may comprise data that is combined with the original video stream but where the data does not comprise residual data. The second layer may also comprise a metadata stream to accompany an original, first layer video stream. For example, the second layer may comprise localised metadata associated with objects or people within the original first layer video stream, such as unique identifiers or hyperlinks to data sources. There may also be multiple base layer and/or multiple enhancement layers as part of a multi-layer video stream and these may be processed similarly to the single base and single enhancement examples described herein.

In one case, the method 600 described herein may be applied as part of an adapted media player implementation. Blocks 602 and 604 may be implemented by a PMT reader or parser that extracts Elementary Streams (ES) from a digital multimedia container such as a transport stream. For example, a transport stream may be detected and a PMT parsed to extract a directory or mapping of programs to a set of PIDs. Blocks 602 and 604 may also involve a transport stream extractor that creates a PES reader for one or more of the identified PID streams. The transport stream extractor may perform functions similar to the stream receiver 210 or the stream generator 310. The PES reader may be generated based on a stream type and stream information (e.g., PES information). The PID for each ES/PES may also be extracted and passed to the corresponding PES reader. In an enhancement coding case, if a corresponding base PID is signalled, then a PES reader for the base stream (e.g., having the base PID) may be shared between a base decoder and an enhancement decoder. When ES metadata are read, if a reference base PID is signalled, the ES for the base is sent to a "base" PES reader. In the present case, all PES readers may have as a consumer a joiner interface that is capable of providing the joint elementary packet stream. Each PES reader may be unaware of the joining and see a sequence of NAL units. The joiner interface may provide data to specific data consumers, such as readers (i.e., decoders) for particular video formats. The joiner interface may be provided by an ES Parser that is fed by two inputs, based on the two PID streams, but has a single output as per comparative ES parsers such as 222 in FIG. 2C. This may be achieved using internal consumers that have the joiner interface as output. The joiner interface is then able to output to PES Reader consumers, as it would in a single PID case.

In certain cases, the NAL units of the second layer may be interleaved with the NAL units of the first layer. In this case, a second layer decoder or second layer pre-processor may parse the sequence of NAL units to extract the NAL units of the second layer from the joined stream.

In certain cases, the joint stream may only require data for the first layer before release. In this case, if the second layer data is present it may be added, but if it is absent (e.g., in whole or part), it may be omitted and only the first layer decoded and viewed. The second layer decoder may thus either skip the enhancements and/or provide a pass through of the first layer output. Hence, the enhancement layer may be flexibly added to the base layer. The present examples allow easy retrofitting of existing stream processing pipelines to manage multi-layer streams. For example, each video decoder expects a single PES stream as input and thus a common interface may be provided, regardless of whether a single layer or multi-layer stream is being decoded. The advanced logic for the upper layers of the multi-layer stream may thus be incorporated into second layer decoders and/or multi-layer controllers that can be easily added to existing options for stream parsing and decoding.

In certain cases, one or more of the example systems 300 and 400, or method 600, may be implemented via instructions retrieved from a computer-readable medium that are executed by a processor of a decoding system, such as a client device.

Certain general information relating to example enhancement coding schemes will now be described. This information provides examples of specific multi-layer coding schemes.

It should be noted that examples are presented herein with reference to a signal as a sequence of samples (i.e., two-dimensional images, video frames, video fields, sound frames, etc.). For simplicity, non-limiting examples illustrated herein often refer to signals that are displayed as 2D planes of settings (e.g., 2D images in a suitable colour space), such as for instance a video signal. In a preferred case, the signal comprises a video signal. An example video signal is described in more detail with reference to FIG. 9.

The terms "picture", "frame" or "field" are used interchangeably with the term "image", so as to indicate a sample in time of the video signal: any concepts and methods illustrated for video signals made of frames (progressive video signals) can be easily applicable also to video signals made of fields (interlaced video signals), and vice versa. Despite the focus of examples illustrated herein on image and video signals, people skilled in the art can easily understand that the same concepts and methods are also applicable to any other types of multidimensional signal (e.g., audio signals, volumetric signals, stereoscopic video signals, 3DoF/6DoF video signals, plenoptic signals, point clouds, etc.). Although image or video coding examples are provided, the same approaches may be applied to signals with dimensions fewer than two (e.g., audio or sensor streams) or greater than two (e.g., volumetric signals).

In the description the terms "image", "picture" or "plane" (intended with the broadest meaning of "hyperplane", i.e., array of elements with any number of dimensions and a given sampling grid) will be often used to identify the digital rendition of a sample of the signal along the sequence of samples, wherein each plane has a given resolution for each of its dimensions (e.g., X and Y), and comprises a set of plane elements (or "element", or "pel", or display element for two-dimensional images often called "pixel", for volumetric images often called "voxel", etc.) characterized by one or more "values" or "settings" (e.g., by ways of non-limiting examples, colour settings in a suitable colour space, settings indicating density levels, settings indicating temperature levels, settings indicating audio pitch, settings indicating amplitude, settings indicating depth, settings indicating alpha channel transparency level, etc.). Each plane element is identified by a suitable set of coordinates, indicating the integer positions of said element in the sampling grid of the image. Signal dimensions can include only spatial dimensions (e.g., in the case of an image) or also a time dimension (e.g., in the case of a signal evolving over time, such as a video signal). In one case, a frame of a video signal may be seen to comprise a two-dimensional array with three colour component channels or a three-dimensional array with two spatial dimensions (e.g., of an indicated resolution—with lengths equal to the respective height and width of the frame) and one colour component dimension (e.g., having a length of 3). In certain cases, the processing described herein is performed individually to each plane of colour component values that make up the frame. For example, planes of pixel values representing each of Y, U, and V colour components may be processed in parallel using the methods described herein.

Certain examples described herein use a scalability framework that uses a base encoding and an enhancement encoding. The video coding systems described herein operate upon a received decoding of a base encoding (e.g., frame-by-frame or complete base encoding) and add one or more of spatial, temporal, or other quality enhancements via an enhancement layer. The base encoding may be generated by a base layer, which may use a coding scheme that differs from the enhancement layer, and in certain cases may comprise a legacy or comparative (e.g., older) coding standard.

FIGS. 7 to 9 show a spatially scalable coding scheme that uses a down-sampled source signal encoded with a base codec, adds a first level of correction or enhancement data to the decoded output of the base codec to generate a corrected picture, and then adds a further level of correction or enhancement data to an up-sampled version of the corrected picture. Thus, the spatially scalable coding scheme may generate an enhancement stream with two spatial resolutions (higher and lower), which may be combined with a base stream at the lower spatial resolution.

In the spatially scalable coding scheme, the methods and apparatuses may be based on an overall algorithm which is built over an existing encoding and/or decoding algorithm (e.g., MPEG standards such as AVC/H.264, HEVC/H.265, etc. as well as non-standard algorithms such as VP9, AV1, and others) which works as a baseline for an enhancement layer. The enhancement layer works accordingly to a different encoding and/or decoding algorithm. The idea behind the overall algorithm is to encode/decode hierarchically the video frame as opposed to using block-based approaches as done in the MPEG family of algorithms. Hierarchically encoding a frame includes generating residuals for the full frame, and then a reduced or decimated frame and so on.

FIG. 7 shows a system configuration for an example spatially scalable encoding system 700. The encoding process is split into two halves as shown by the dashed line. Each half may be implemented separately. Below the dashed line is a base level and above the dashed line is the enhancement level, which may usefully be implemented in software. The encoding system 700 may comprise only the enhancement level processes, or a combination of the base level processes and enhancement level processes as needed. The encoding system 700 topology at a general level is as follows. The encoding system 700 comprises an input I for receiving an input signal 701. The input I is connected to a down-sampler 705D. The down-sampler 705D outputs to a base encoder 720E at the base level of the encoding system 700. The down-sampler 705D also outputs to a residual generator 710-S. An encoded base stream is created directly by the base encoder 720E, and may be quantised and entropy encoded as necessary according to the base encoding scheme. The encoded base stream may be the base layer as described above, e.g. a lowest layer in a multi-layer coding scheme.

Above the dashed line is a series of enhancement level processes to generate an enhancement layer of a multi-layer coding scheme. In the present example, the enhancement layer comprises two sub-layers. In other example, one or more sub-layers may be provided. In FIG. 7, to generate an encoded sub-layer 1 enhancement stream, the encoded base stream is decoded via a decoding operation that is applied at a base decoder 720D. In preferred examples, the base decoder 720D may be a decoding component that complements an encoding component in the form of the base encoder 720E within a base codec. In other examples, the base decoding block 720D may instead be part of the enhancement level. Via the residual generator 710-S, a difference between the decoded base stream output from the base decoder 720D and the down-sampled input video is created (i.e., a subtraction operation 710-S is applied to a frame of the down-sampled input video and a frame of the decoded base stream to generate a first set of residuals). Here, residuals represent the error or differences between a reference signal or frame and a desired signal or frame. The residuals used in the first enhancement level can be considered as a correction signal as they are able to 'correct' a frame of a future decoded base stream. This is useful as this can correct for quirks or other peculiarities of the base codec. These include, amongst others, motion compensation algorithms applied by the base codec, quantisation and entropy encoding applied by the base codec, and block adjustments applied by the base codec.

In FIG. 7, the first set of residuals are transformed, quantised and entropy encoded to produce the encoded enhancement layer, sub-layer 1 stream. In FIG. 7, a transform operation 710-1 is applied to the first set of residuals; a quantisation operation 720-1 is applied to the transformed set of residuals to generate a set of quantised residuals; and, an entropy encoding operation 730-1 is applied to the quantised set of residuals to generate the encoded enhancement layer, sub-layer 1 stream (e.g., at a first level of enhancement). However, it should be noted that in other examples only the quantisation step 720-1 may be performed, or only the transform step 710-1. Entropy encoding may not be used, or may optionally be used in addition to one or both of the transform step 710-1 and quantisation step 720-1. The entropy encoding operation can be any suitable type of entropy encoding, such as a Huffmann encoding operation or a run-length encoding (RLE) operation, or a combination of both a Huffmann encoding operation and a RLE operation (e.g., RLE then Huffmann or prefix encoding).

To generate the encoded enhancement layer, sub-layer 2 stream, a further level of enhancement information is created by producing and encoding a further set of residuals via residual generator 700-S. The further set of residuals are the difference between an up-sampled version (via up-sampler 705U) of a corrected version of the decoded base stream (the reference signal or frame), and the input signal 701 (the desired signal or frame).

To achieve a reconstruction of the corrected version of the decoded base stream as would be generated at a decoder (e.g., as shown in FIG. 8), at least some of the sub-layer 1 encoding operations are reversed to mimic the processes of the decoder, and to account for at least some losses and quirks of the transform and quantisation processes. To this end, the first set of residuals are processed by a decoding pipeline comprising an inverse quantisation block 720-1*i* and an inverse transform block 710-1*i*. The quantised first set of residuals are inversely quantised at inverse quantisation block 720-1*i* and are inversely transformed at inverse transform block 710-1*i* in the encoding system 700 to regenerate a decoder-side version of the first set of residuals.

The decoded base stream from decoder 720D is then combined with the decoder-side version of the first set of residuals (i.e., a summing operation 710-C is performed on the decoded base stream and the decoder-side version of the first set of residuals). Summing operation 710-C generates a reconstruction of the down-sampled version of the input video as would be generated in all likelihood at the decoder—i.e. a reconstructed base codec video). The reconstructed base codec video is then up-sampled by up-sampler 705U. Processing in this example is typically performed on a frame-by-frame basis. Each colour component of a frame may be processed as shown in parallel or in series.

The up-sampled signal (i.e., reference signal or frame) is then compared to the input signal 701 (i.e., desired signal or frame) to create the further set of residuals (i.e., a difference operation is applied by the residual generator 700-S to the up-sampled re-created frame to generate a further set of residuals). The further set of residuals are then processed via an encoding pipeline that mirrors that used for the first set of residuals to become an encoded enhancement layer, sub-layer 2 stream (i.e., an encoding operation is then applied to the further set of residuals to generate the encoded further enhancement stream). In particular, the further set of residuals are transformed (i.e., a transform operation 710-0 is performed on the further set of residuals to generate a further transformed set of residuals). The transformed residuals are then quantised, and entropy encoded in the manner described above in relation to the first set of residuals (i.e., a quantisation operation 720-0 is applied to the transformed set of residuals to generate a further set of quantised residuals; and, an entropy encoding operation 730-0 is applied to the quantised further set of residuals to generate the encoded enhancement layer, sub-layer 2 stream containing the further level of enhancement information). In certain cases, the operations may be controlled, e.g. such that, only the quantisation step 720-1 may be performed, or only the transform and quantisation step. Entropy encoding may optionally be used in addition. Preferably, the entropy encoding operation may be a Huffmann encoding operation or a run-length encoding (RLE) operation, or both (e.g., RLE then Huffmann encoding). The transformation applied at both blocks 710-1 and 710-0 may be a Hadamard transformation that is applied to 2×2 or 4×4 blocks of residuals.

The encoding operation in FIG. 7 does not result in dependencies between local blocks of the input signal (e.g., in comparison with many known coding schemes that apply inter or intra prediction to macroblocks and thus introduce macroblock dependencies). Hence, the operations shown in FIG. 7 may be performed in parallel on 4×4 or 2×2 blocks, which greatly increases encoding efficiency on multicore central processing units (CPUs) or graphical processing units (GPUs).

As illustrated in FIG. 7, the output of the spatially scalable encoding process is one or more enhancement streams for an enhancement layer which preferably comprises a first level of enhancement and a further level of enhancement. This is then combinable (e.g., via multiplexing or otherwise) with a base stream at a base level, e.g. into the Transport Stream 102 as described above or as multiple tracks within another digital container. The first level of enhancement (sub-layer 1) may be considered to enable a corrected video at a base level, that is, for example to correct for encoder quirks. The second level of enhancement (sub layer 2) may be considered to be a further level of enhancement that is usable to convert the corrected video to the original input video or a close approximation thereto. For example, the second level of enhancement may add fine detail that is lost during the downsampling and/or help correct from errors that are introduced by one or more of the transform operation 710-1 and the quantisation operation 720-1.

FIG. 8 shows a corresponding example decoding system 800 for the example spatially scalable coding scheme. The enhancement layer processing shown above the dotted line may be implemented by the second layer decoder as described herein, e.g. the second layer decoder 324 and the multi-layer controller 326 of FIG. 3 or the second renderer 436 of FIG. 4. The base layer processing shown below the dotted line may be implemented by the first layer decoder as described herein, e.g. the first layer decoder 324 of FIG. 3 or the first decoder 420 of FIG. 4.

In FIG. 8, the encoded base stream is decoded at base decoder 820 in order to produce a base reconstruction of the input signal 701. This base reconstruction may be used in practice to provide a viewable rendition of the signal 701 at the lower quality level. However, the primary purpose of this base reconstruction signal is to provide a base for a higher quality rendition of the input signal 701. To this end, the decoded base stream is provided for enhancement layer, sub-layer 1 processing (i.e., sub-layer 1 decoding). Sub-layer 1 processing in FIG. 8 comprises an entropy decoding process 830-1, an inverse quantisation process 820-1, and an inverse transform process 810-1. Optionally, only one or more of these steps may be performed depending on the operations carried out at corresponding block 700-1 at the encoder. By performing these corresponding steps, a decoded enhancement layer, sub-layer 1 stream comprising the first set of residuals is made available at the decoding system 800. The first set of residuals is combined with the decoded base stream from base decoder 820 (i.e., a summing operation 810-C is performed on a frame of the decoded base stream and a frame of the decoded first set of residuals to generate a reconstruction of the down-sampled version of the input video—i.e. the reconstructed base codec video). A frame of the reconstructed base codec video is then up-sampled by up-sampler 805U.

Additionally, and optionally in parallel, the encoded enhancement layer, sub-layer 2 stream is processed to produce a decoded further set of residuals. Similar to sub-layer 1 processing, enhancement layer, sub-layer 2 processing comprises an entropy decoding process 830-0, an inverse quantisation process 820-0 and an inverse transform process 810-0. Of course, these operations will correspond to those performed at block 700-0 in encoding system 700, and one or more of these steps may be omitted as necessary. Block 800-0 produces a decoded enhancement layer, sub-layer 2 stream comprising the further set of residuals, and these are summed at operation 800-C with the output from the up-sampler 805U in order to create an enhancement layer, sub-layer 2 reconstruction of the input signal 701, which may be provided as the output of the decoding system 800. Thus, as illustrated in FIGS. 7 and 8, the output of the decoding process may comprise up to three outputs: a base reconstruction, a corrected lower resolution signal and an original signal reconstruction for the multi-layer coding scheme at a higher resolution.

With reference to the example 300 of FIG. 3, the residual "decoding" processes 710, 720, 730 may be performed by the second layer decoder 324, wherein the two sub-layers are provided as part of the enhancement layer NAL units.

In general, examples described herein operate within encoding and decoding pipelines that comprises at least a transform operation. The transform operation may comprise the DCT or a variation of the DCT, a Fast Fourier Transform (FFT), or, in preferred examples, a Hadamard transform as implemented by LCEVC. The transform operation may be applied on a block-by-block basis. For example, an input signal may be segmented into a number of different consecutive signal portions or blocks and the transform operation may comprise a matrix multiplication (i.e., linear transformation) that is applied to data from each of these blocks (e.g., as represented by a 1D vector). In this description and in the art, a transform operation may be said to result in a set of values for a predefined number of data elements, e.g. representing positions in a resultant vector following the transformation. These data elements are known as transformed coefficients (or sometimes simply "coefficients").

As described herein, where the enhancement data comprises residual data, a reconstructed set of coefficient bits may comprise transformed residual data, and a decoding method may further comprise instructing a combination of residual data obtained from the further decoding of the reconstructed set of coefficient bits with a reconstruction of the input signal generated from a representation of the input signal at a lower level of quality to generate a reconstruction of the input signal at a first level of quality. The representation of the input signal at a lower level of quality may be a decoded base signal and the decoded base signal may be optionally upscaled before being combined with residual data obtained from the further decoding of the reconstructed set of coefficient bits, the residual data being at a first level of quality (e.g., a first resolution). Decoding may further comprise receiving and decoding residual data associated with a second sub-layer, e.g. obtaining an output of the inverse transformation and inverse quantisation component, and combining it with data derived from the aforementioned reconstruction of the input signal at the first level of quality. This data may comprise data derived from an upscaled version of the reconstruction of the input signal at the first level of quality, i.e. an upscaling to the second level of quality.

Further details and examples of a two sub-layer enhancement encoding and decoding system may be obtained from published LCEVC documentation. Although examples have been described with reference to a tier-based hierarchical coding scheme in the form of LCEVC, the methods described herein may also be applied to other tier-based hierarchical coding scheme, such as VC-6: SMPTE VC-6 ST-2117 as described in PCT/GB2018/053552 and/or the associated published standard document, which are both incorporated by reference herein.

FIG. 9 shows an example 900 of how a video signal may be decomposed into different components and then encoded. In the example of FIG. 9, a video signal 902 is encoded. The video signal 902 comprises a plurality of frames or pictures 904, e.g. where the plurality of frames represent action over time. In this example, each frame 904 is made up of three colour components. The colour components may be in any known colour space. In FIG. 9, the three colour components 906 are Y (luma), U (a first chroma opponent colour) and V (a second chroma opponent colour). Each colour component may be considered a plane 908 of values. The plane 908 may be decomposed into a set of n by n blocks of signal data 910. For example, in LCEVC, n may be 2 or 4; in other video coding technologies n may be 8 to 32.

In LCEVC and certain other coding technologies, a video signal fed into a base layer is a downscaled version of the input video signal, e.g. 701. In this case, the signal that is fed into both sub-layers of the enhancement layer comprises a residual signal comprising residual data. A plane of residual data may also be organised in sets of n-by-n blocks of signal data 910. The residual data may be generated by comparing data derived from the input signal being encoded, e.g. the video signal 701, and data derived from a reconstruction of the input signal, the reconstruction of the input signal being generated from a representation of the input signal at a lower level of quality. The comparison may comprise subtracting the reconstruction from the downsampled version. The comparison may be performed on a frame-by-frame (and/or block-by-block) basis. The comparison may be performed at the first level of quality; if the base level of quality is below the first level of quality, a reconstruction from the base level of quality may be upscaled prior to the comparison. In a similar manner, the input signal to the second sub-layer, e.g. the input for the second sub-layer transformation and quantisation component, may comprise residual data that results from a comparison of the input video signal 701 at the second level of quality (which may comprise a full-quality original version of the video signal) with a reconstruction of the video signal at the second level of quality. As before, the comparison may be performed on a frame-by-frame (and/or block-by-block) basis and may comprise subtraction. The reconstruction of the video signal may comprise a reconstruction generated from the decoded decoding of the encoded base bitstream and a decoded version of the first sub-layer residual data stream. The reconstruction may be generated at the first level of quality and may be upsampled to the second level of quality.

Hence, a plane of data 908 for the first sub-layer may comprise residual data that is arranged in n-by-n signal blocks 910. One such 2 by 2 signal block is shown in more detail in FIG. 9 (n is selected as 2 for ease of explanation) where for a colour plane the block may have values 912 with a set bit length (e.g., 8 or 16-bit). Each n-by-n signal block may be represented as a flattened vector 914 of length $n^2$ representing the blocks of signal data. To perform the transform operation, the flattened vector 914 may be multiplied by a transform matrix 916 (i.e., the dot product taken). This then generates another vector 918 of length $n^2$ representing different transformed coefficients for a given signal block 910. FIG. 9 shows an example similar to LCEVC where the transform matrix 916 is a Hadamard matrix of size 4 by 4, resulting in a transformed coefficient vector 918 having four elements with respective values. These elements are sometimes referred to by the letters A, H, V and D as they may represent an average, horizontal difference, vertical difference and diagonal difference. Such a transform operation may also be referred to as a directional decomposition. When n=4, the transform operation may use a 16 by 16 matrix and be referred to as a directional decomposition squared.

As shown in FIG. 9, the set of values for each data element across the complete set of signal blocks 910 for the plane 908 may themselves be represented as a plane or surface of coefficient values 920. For example, values for the "H" data elements for the set of signal blocks may be combined into a single plane, where the original plane 908 is then represented as four separate coefficient planes 922. For example, the illustrated coefficient plane 922 contains all the "H" values. These values are stored with a predefined bit length, e.g. a bit length B, which may be 8, 16, 32 or 64 depending on the bit depth. A 16-bit example is considered below but this is not limiting. As such, the coefficient plane 922 may be represented as a sequence (e.g., in memory) of 16-bit or 2-byte values 924 representing the values of one data element from the transformed coefficients. These may be referred to as coefficient bits. These coefficient bits may be quantised and then entropy encoded as discussed to then generate the encoded enhancement layer data (e.g., "L" PID stream 504) as described above.

In certain cases, for LCEVC video streams, e.g. as described above with reference to FIGS. 6 to 9, a PTS may be present in a PES packet header. In one case, the PTS timestamp may refer to only one LCEVC access unit that commences in this PES packet. In certain cases, a decoding time stamp (DTS) may not be present in the PES packet header because the LCEVC decoding is in presentation order.

A set of additional examples will now be described. These operate within a similar context to the examples set out above but differ in certain aspects. These examples may or may not be used with a multi-layer scheme such as that described with reference to FIGS. 7 to 9.

In one example, a method of processing a multi-layer video stream is provided. The multi-layer video stream encodes a video signal and comprises at least a first layer and a second layer. In this example, the method comprises: receiving a first packet sub-stream for the first layer; receiving a second packet sub-stream for the second layer; and, joining packets from the first packet sub-stream and the second packet sub-stream to generate a joint elementary packet stream, the joint elementary packet stream comprising a sequence of packets comprising data for both the first layer and the second layer. In this case, each packet of the first packet sub-stream may comprise a header and a data payload, where the data payload comprises the encoded data for the first layer, and each packet of the second packet sub-stream may comprise a header and a data payload, the data payload comprising the encoded data for the second layer. For example, this method may comprise a method similar to that performed by the stream generator 310. However, this method may be performed at an encoder such that the joint elementary stream is transmitted as a single PID stream to a decoder, e.g. as part of a transport stream.

Variations of the example above are shown in FIGS. 10 and 11. In FIG. 10, a Transport Stream 1002 is generated comprising at least two elementary streams: a first elementary stream has a PID of "C" and a second elementary stream has a PID of "D". This Transport Stream 1002 may be generated at an encoder for supply to one or more client devices. At a client device, a particular elementary stream may be reconstructed using packets of the Transport Stream 1002 with a common (i.e., equal or shared) PID. In FIG. 10, packets with a PID of "C" are extracted (e.g., demultiplexed) from the Transport Stream 1002 to form PID stream 1004. As in previous examples, the payload data from the packets in the PID stream 1004 may be combined to form a packetized elementary stream 1008. For example, a packetized elementary stream 1008 may have packets with a header 1018 and a payload 1016 that correspond to frames (or planes) of a video stream. In this case, the payload 1016 comprises a NALU stream 1020 that comprises NAL units for a first layer 1022 and NAL units for at least a second layer 1024. Hence, in this case, a NALU or data stream 1020 similar to 520 in FIG. 5 may be extracted from the Transport Stream 1002. However, in this example, the NALU or data stream 1020 is derived from a single PID stream (or at least a smaller number of PID streams than constitute the number of layers in the multi-layer scheme). For example, a component similar to the stream generator 310 may receive encoded data for multiple layers, e.g. from different encoders or encoding systems and generate the elementary stream 1008 by interleaving this encoded data across multiple frames. The PID stream 1004 may then be generated by packetizing the elementary stream 1008 and multiplexing the resulting packets in the Transport Stream 1002. In this case, a decoder may be based on the example of FIG. 3 but omit the stream generator 310, passing the frame-interleaved multi-layer NALU stream from stream receiver 210 to first layer and second layer decoders 322, 324 or omitting the ES Parser Joiner 410 in FIG. 4. In the solution the different bitstreams for multiple layers of a multi-layer coding scheme are interleaved and used to provide a data stream to different decoders. A legacy decoder (such as the first layer decoder described above) may thus be able to decode first layer encoded data in the interleaved or combined stream and generate a first layer video output; an enhancement decoder (such as the second layer decoder described above) may also use data from the same interleaved or combined stream to generate a second layer video output. Outputs for both layers may then be combined to provide a multi-layer or enhanced output video.

FIG. 11 shows a method 1100 that may be performed at an encoding device. At block 1102, a first layer packet stream is received. At block 1104, a second layer packet stream is received. For example, these may be output by respective first and second layer encoders. The packets may be NAL units, PES packets and/or PID stream packets. At block 1106, the packets are joined to generate a joint packet stream. This may be a joint NALU or elementary stream. At block 1108, the joint packet stream is packaged as if it was a first layer data stream. This may comprise setting metadata for the joint packet stream to indicate that it is of a first layer format. Additional metadata may or may not be set to indicate that the joint packet stream is part of a multi-layer encoding (depending on implementation). In one case, a first layer decoder receiving the joint packet stream ignores NAL units for any layer that is not the first layer based on differentiated values in the NAL header (e.g., NAL units for the first layer may indicate a first NALU type and NAL units for other layers may indicate a reserved, unused, or other NALU type).

Although examples are presented herein in the form of transmitted streams, static media files are also based on the same framework and so the methods described herein may also be applied to media "containers", such as those that wrap encoded media content.

In certain variations of the examples described above (e.g., those described with reference to FIGS. 10 and 11), a joint elementary packet stream is parseable by a first layer decoder to reconstruct data for the first layer and parseable by a second layer decoder to reconstruct data for the second layer, wherein outputs of the first and second layer decoders are combinable to reconstruct a video output from the multi-layer video stream.

In certain variations, a single packet identifier is assigned to the joint elementary packet stream. For example, "C" in FIG. 10. This allows the joint elementary packet stream to be transmitted and/or broadcast as if it was a first layer encoded stream. The joint elementary packet stream may then be decoded and rendered by first layer decoders as per normal legacy first layer streams. However, second layer (and above) decoders may extract the additional second layer (and above) encoded data from the same stream, e.g. they may be configured to check first layer streams for this data and/or this may be indicated in metadata for the first layer stream that is ignored by the first layer decoder.

In certain variations, methods set out above may comprise transmitting the joint elementary packet stream as part of a packetised transport stream to one or more video decoders, data for the joint elementary packet stream being indicated by the single packet identifier in packet headers of the packetised transport stream. For example, this is shown in FIG. 10. In this case, the single packet identifier may be associated with the first packet sub-stream for the first layer in metadata for the joint elementary packet stream.

In certain aspects, a method of processing a multi-layer video stream is provided. Again, the multi-layer video stream encodes a video signal and comprises at least a first layer and a second layer. In this aspect, the method comprises receiving encoded data for the first layer; receiving encoded data for the second layer; and combining the encoded data for the first layer and the encoded data for the second layer as a single elementary packet stream with a single packet identifier, the single packet identifier being linked with the first layer within metadata for the single elementary packet stream. This method may be performed at an encoder (e.g., as per the recent examples) or at a decoder (e.g., as per the examples of FIGS. 3 to 6).

In this aspect, the method may further comprise, e.g. at a service provider server, transmitting the single elementary packet stream as part of a transport stream to one or more decoding devices. This may occur if a joint or single stream is generated at an encoder.

In this aspect, the encoded data for the first layer and the encoded data for the second layer may be interleaved. For examples, PES payloads for frames or planes of a video signal may result in data being grouped in a BLBLBLBL-BLB . . . format, where B indicates data (e.g., NAL units) for a first or base layer and L indicates data (e.g., NAL units) for a second or LCEVC/enhancement layer. Interleaving may enable the simple synchronisation of different layers and provide robustness to reduce stream latencies.

In the above cases, a method of decoding a transport stream as generated by encoder generating the single encoded data stream may comprise: extracting an elementary packet stream from the transport stream based on the single packet identifier; communicating data from the elementary packet stream to a first layer decoder based on a mapping between the single packet identifier and the first layer; communicating data from the elementary packet stream to a second layer decoder to determine if the elementary packet stream comprises encoded data for the second layer; and, responsive to a determination that the elementary packet stream comprises encoded data for the second layer, combining an output of the first layer decoder and the second layer decoder to provide a multi-layer reconstruction of the video signal. For example, metadata for a program represented by the elementary packet stream, such as one or more of PSI, PAT, PMT, and descriptor data, may indicate that the elementary packet stream also comprises data for one or more additional layers and/or the second layer decoder may inspect data packets for the elementary packet stream to determine if they contain metadata (such as header data) that indicates the presence of other layer encoded data. In certain cases, the first layer decoder may be a legacy hardware and/or software decoder that is not able to be updated with new functionality, where other layer decoders (such as the second layer decoder) may be updatable with new functionality and so may encompass additional logic to parse the combined data stream. In one case, a second layer decoder may be passed at least a portion of data from all compatible first layer data streams and may only be activated if second layer data is detected within those streams.

In one variation, the second layer decoder is configured to inspect header data from one or more network abstraction layer units derived from the elementary packet stream to determine if the elementary packet stream comprises encoded data for the second layer. In this case, the first layer decoder may be configured to ignore NAL units contained encoded data for the second layer based on values within the headers of said NAL units.

FIG. 12 shows a further example method 1200 of processing multi-layer streams. The multi-layer video stream may encode a video signal and comprising at least a first layer and a second layer. The method 1200 comprises a first block 1202 of receiving a first encoded data stream for the first layer of the multi-layer video stream. This may be an encoded data stream that is read from a media file or received as part of a multiplexed stream. In one case, it may be received as a PID stream 104 as shown in FIG. 5; in another case, it may be part of a combined stream such as 1008 in FIG. 10. The receiving may be performed over a network and/or from local memory.

At block 1204, a descriptor field of the first encoded data stream is parsed to extract an identifier for the first encoded data stream. The descriptor field may be a descriptor field as defined as part of metadata for the first encoded data stream, such as PSI data. The descriptor field may be set as a value that is ignored by a first layer decoder, such as a reserved value for one or more first layer coding standards.

At block 1206, a second encoded data stream is received for the second layer of the multi-layer video stream. The second encoded data stream may be received in a similar manner to the first layer of the multi-layer video stream, e.g. as PID stream 504 in FIG. 5 or a joint PES such as 1008 in FIG. 10. At block 1208, a descriptor field of the second encoded data stream is parsed to determine whether the identifier for the first encoded data stream is present. The descriptor field may be the same descriptor field as is used to carry the identifier extracted at block 1204 or may comprise an additional descriptor field that is added for the second encoded data stream. In one case, the same descriptor field for all the related layers in the multi-layer coding scheme is set to carry the value used by the lowest layer in the coding scheme (e.g., a base identifier or tag).

At block 1210, conditional logic is applied based on the parsing performed at blocks 1204 and 1208. For example, responsive to the presence of the identifier for the first encoded data stream as determined in block 1208, the first and second encoded data streams are paired as set out in block 1212 and a decoding of the multi-layer video stream is instructed based on the paired data. For example, this decoding may comprise the decoding shown in FIG. 8, where the paired data streams are supplied respectively as base and enhancement layer data. If no identifier is detected in the second encoded data stream and/or an identifier is present but does not match the particular first layer identifier extracted at block 1204, then the first encoded data may be encoded by a first layer decoded and rendered as per a normal single layer decoding.

The method of FIG. 1200 is thus an example of the general approach of using a tag in the descriptor of an enhancement layer to reference an associated base layer. Base and enhancement layers (and there may be one or more of both) may thus be grouped based on data carried in stream metadata. In this manner, a first layer data stream may be transmitted and decoded in a normal manner for a first layer data stream yet a second layer data stream (e.g., for enhancement) may be flexibly tied to the first layer data stream such that decoded second layer data may be combined with decoded first layer data. In these cases, an enhancement layer may reference a base layer via a tag as carried in the descriptor fields, but a base layer may not reference an enhancement layer. This allows the enhancement to be flexibly added to different pre-existing or legacy base streams. In certain cases, tags may be provided in both data streams but both data streams may be transmitted as independent PID streams.

In certain variations, e.g. of FIG. 1200, the first and second encoded data streams are part of a joint elementary stream with a single packet identifier. In this case, the joint elementary stream is identified as an elementary stream according to a format of the first layer such that the joint elementary stream is parseable by a first layer decoder. In other variations, the first and second encoded data streams are separate elementary streams with different packet identifiers.

In certain cases, the first encoded data stream for the first layer (e.g., as read as a media track from a file or received as a PID stream) appears as a first layer encoded bitstream. However, it actually carries interleaved encoded data for multiple layers.

In certain aspects, a method of decoding a multi-layer video stream comprises accessing a media track of a data file structure, the media track being identified by an identifier, the media track carrying the multi-layer video stream, the multi-layer video stream encoding a video signal and comprising data representing a first layer and data representing a second layer; parsing the identifier to instruct decoding of the data representing the first layer using a first layer decoder, wherein the identifier is defined according to an encoding format of the first layer, wherein data within the media track is accessed by the first layer decoder; and parsing the identifier to instruct decoding of the data representing the second layer using the second layer decoder, wherein outputs of the first and second layer decoders are combinable to reconstruct an output for the multi-layer video stream. In this case, as an adaptation of the method of FIG. 1200 as applied to media containers, instead of storing multiple layers of a multi-layer encoding as separate tracks with a media file (e.g., analogous to different PID streams within a broadcast), the multiple layers are stored as one track that resembles a lowest or legacy layer that is used for the encoding. This then enables the data to be read by a lowest or legacy decoder, with data for other layers being ignored or skipped based on identifying metadata (such as NALU header data). As for previous examples, higher layer decoders (e.g., second layer decoders) may be configured to monitor the activity of first layer decoders and decode data from the same track to enhance the first layer.

In certain examples as described herein, the encoded data for the first layer and encoded data for the second layer are generated using different video encoders. For example, selectable base codecs generate the first layer and an LCEVC codec generates further layers.

In certain examples described herein a first layer video stream may form a base layer for multiple enhancement streams (e.g., multiple second layer streams). In this case, each enhancement stream may have a different function and/or may carry differentiated content. For example, enhancement streams may be provided at different levels of quality (such as different bit rates, colour depths, and/or resolutions) and/or may include different content to be overlaid over base stream content. For example, an enhancement stream may provide different text for different languages or different advertising content for different users or areas. In one case, each LCEVC stream may encode different logo content for surfaces visible in the base video stream, such as sport hoardings or billboards within videos. This approach, and the use of descriptors more generally, may be applied to both video streams over a network and file-based content (e.g., streams as recorded as bit sequences within files).

In a case where there is one first layer or base stream and multiple second layer or enhancement streams, a descriptor may be provided that has a loop function and defines the plurality of additional streams that are associated with the first layer or base stream. This descriptor with a loop function may be provided as part of the first layer or base stream, thus allowing any decoder that receives the first layer or base stream to have access to a set of identifiers for available second layer or enhancement streams. Each second layer or enhancement stream may have a descriptor with the identifier for that stream. Hence, the decoders may pair base and multiple different enhancement streams but legacy base decoders may ignore the additional descriptors that accompany the base stream and simply decode the base stream as per single layer cases.

In an LCEVC case, an LCEVC video extension descriptor may be defined. Each LCEVC video stream (e.g., a "second layer" stream as discussed in examples herein) may have an LCEVC video descriptor that is present in a descriptor loop of a program map section for the LCEVC video stream. A base video stream (e.g., a first layer stream as discussed in examples herein) may constitute a base video stream for more than one LCEVC video stream. The base video stream may also comprise an LCEVC video extension descriptor. As set out above, the base video stream may comprise multiple LCEVC video extension descriptors (in a so-called descriptor "loop"), where each LCEVC video extension descriptor comprises an identifier that identifies an association with a different LCEVC encoded video stream. The LCEVC video extension descriptor may be identified using an extension descriptor tag, e.g. a tag with a value of "0x17" that was previously defined as "reserved". As such legacy base decoders may simply ignore LCEVC video extension descriptor as the value is deemed not used in their configuration.

An each LCEVC video extension descriptor may have a form similar to that set out in the table below:

| Syntax | No. Of bits | Mnemonic |
|---|---|---|
| LCEVC_video_descriptor( ) { | | |
| lcevc_stream_tag | 8 | uimsbf |
| profile_idc | 4 | uimsbf |
| level_idc | 4 | uimsbf |
| sublevel_idc | 2 | uimsbf |
| processed_planes_type_flag | 1 | bslbf |
| picture_type_bit_flag | 1 | bslbf |
| field_type_bit_flag | 1 | bslbf |
| reserved | 3 | bslbf |
| HDR_WCG_idc | 2 | uimsbf |
| reserved_zero_2bit | 2 | bslbf |
| video_properties_tag | 4 | uimsbf |
| } | | |

In this case, the lcevc_stream_tag field is an 8 bit field specifying the identifier of an association between a base and an enhancement encoded video stream. In other alternative examples, the lcevc_stream_tag may be replaced with a PID of a base stream to form the link between streams. The other fields may then provide additional optional information regarding the LCEVC video stream, such as properties of the LCEVC video stream.

An LCEVC registration descriptor may also be provided that defines a set of available lcevc_stream_tags that may be used. For example, this may have the form:

| Syntax | No. Of bits | Mnemonic |
|---|---|---|
| LCEVC_registration_descriptor( ) { | | |
| descriptor_tag | 8 | uimsbf |
| descriptor_length | 8 | uimsbf |
| format_identifier | 32 | uimsbf |
| num_lcevc_stream_tags | 8 | uimsbf |
| for (i=0; i<num_lcevc_stream_tags; i++) { | | uimsbf |
| lcevc_stream_tag | 8 | |
| } | | |
| } | | |

This descriptor may be used for a base stream, where num_lcevc_stream_tags defines the number of associated enhancement streams and the inbuilt loop repeats the lcevc_stream_tags for each enhancement stream in turn. As before, the lcevc_stream_tag tag value allows indicating the video elementary stream as the base of an LCEVC video stream that carries the same tag value in its LCEVC video descriptor. In cases where there is a single base and enhancement stream the base descriptor may just contain one lcevc_stream_tag.

In certain cases, one or more of the example systems 300 and 400, method 600, method 1100, method 1200 or any other of the examples described herein may be implemented via instructions retrieved from a computer-readable medium. These may be executed by a processor of a decoding system, such as a client device. In one case, examples related to method 1100 may be implemented by way of instructions retrieved from a computer-readable medium and executed by a processor of an encoding system, such as an encoding server.

The techniques described herein may be implemented in software or hardware, or may be implemented using a combination of software and hardware. They may include configuring an apparatus to carry out and/or support any or all of techniques described herein. The above examples are to be understood as illustrative. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A method of decoding a multi-layer video stream, the multi-layer video stream comprising at least a first layer and a second layer, the method comprising:

receiving a first packet sub-stream for the first layer, each packet of the first packet sub-stream comprising a header and a data payload, the first packet sub-stream being identified via a first packet identifier indicated in the header and being received as part of a transport stream;

receiving a second packet sub-stream for the second layer, each packet of the second packet sub-stream comprising a header and a data payload, the second packet sub-stream being identified via a second packet identifier indicated in the header and being received as part of the transport stream;

joining packets from the first packet sub-stream and the second packet sub-stream to generate a joint elementary packet stream, the joint elementary packet stream comprising a sequence of packets comprising data for both the first layer and the second layer, a payload of the joint elementary packet stream comprising a sequence of network abstraction layer units for the first layer concatenated with a sequence of network abstraction layer units for the second layer;

providing the joint elementary packet stream to a first layer decoder for decoding of the data for the first layer within the joint elementary packet stream;

providing the joint elementary packet stream to a second layer decoder for decoding of at least the data for the second layer within the joint elementary packet stream, wherein the first layer decoder differs from the second layer decoder; and combining an output of the first layer decoder and an output of the second layer decoder to provide a multi-layer reconstruction of a video signal.

2. The method of claim 1, wherein the data payloads of the first packet sub-stream form a first packetized elementary stream and the data payloads of the second packet sub-stream form a second packetized elementary stream, wherein the joint elementary packet stream comprises a third packetized elementary stream with a header comprising a presentation time stamp, a data payload following the header comprising data payloads from the first and second packetized elementary streams that are associated with the presentation time stamp.

3. The method of claim 1, wherein the first and second packet sub-streams are transmitted such that the data payload of the second packet sub-stream arrives no later than the data payload of a corresponding portion of the first packet sub-stream.

4. The method of claim 1, wherein the first layer decoder is configured to ignore the network abstraction layer units for the second layer based on unit type data values within a header of the network abstraction layer units for the second layer.

5. The method of claim 1, wherein an output of the first layer decoder is renderable independently of the multi-layer reconstruction of the video signal.

6. The method of claim 1, further comprising:

receiving the transport stream comprising the first packet sub-stream and the second packet sub-stream; and demultiplexing the transport stream to extract the first packet sub-stream and the second packet sub-stream.

7. The method of claim 1, wherein the first layer comprises a base video stream and the second layer comprises an enhancement video stream, and wherein the multi-layer reconstruction of the video signal comprises a higher quality rendition of a base video signal decoded from the base video stream.

8. The method of claim 7, wherein data for the second layer comprises frames of residual data that are combined with frames of the base video signal as decoded from the base video stream.

9. The method of claim 8, wherein the second layer comprises a Low Complexity Enhancement Video Coding (LCEVC) video stream.

10. The method of claim 1, wherein the second layer comprises a watermarking stream.

11. A video decoder comprising:

a stream receiver to coordinate receipt of first and second packet sub-streams corresponding to first and second layers of a multi-layer video stream, each packet of the first and second packet sub-streams comprising a header and a data payload, the first packet stream being identified via a first packet identifier indicated in the header and the second packet stream being identified via a second packet identifier indicated in the header, the first and second packet sub-streams being received as part of a transport stream;

a stream generator to receive the first and second packet sub-streams and to generate a joint elementary packet stream, the joint elementary packet stream comprising a sequence of packets comprising data for both the first and the second layers, a payload of the joint elementary packet stream comprising a sequence of network abstraction layer units for the first layer concatenated with a sequence of network abstraction layer units for the second layer;

a first layer decoder to receive the joint elementary packet stream generated by the stream generator and to output a decoding of the data for the first layer within the joint elementary packet stream;

a second layer decoder to receive the joint elementary packet stream generated by the stream generator and to output a decoding of the data for the second layer within the joint elementary packet stream, the second layer decoder being different to the first layer decoder; and a multi-layer controller to combine an output of the first layer decoder and an output of the second layer decoder to provide a multi-layer reconstruction of a video signal.

12. The video decoder of claim 11, wherein the stream receiver comprises a demultiplexer to receive and demultiplex the transport stream comprising the first packet sub-stream and the second packet sub-stream.

13. The video decoder of claim 11, wherein the data payloads of the first packet sub-stream form a first packetized elementary stream and the data payloads of the second packet sub-stream form a second packetized elementary stream, wherein the joint elementary packet stream comprises a third packetized elementary stream with a header comprising a presentation time stamp, the data payload following the header comprising data payloads from the first and second packetized elementary streams that are associated with the presentation time stamp, wherein the first and second packet sub-streams are transmitted such that the data payload of the second packet sub-stream arrives no later than the data payload of a corresponding portion of the first packet sub-stream.

14. The video decoder of claim 11, wherein the first layer decoder is configured to ignore the network abstraction layer units for the second layer based on unit type data values within a header of the network abstraction layer units for the second layer.

15. The video decoder of claim 11, further comprising:

a first layer renderer to render an output of the first layer decoder on a display device; and a multi-layer renderer to render the multi-layer reconstruction on the display device.

16. The video decoder of claim 11, wherein the first layer comprises a base video stream and the second layer comprises an enhancement video stream, and wherein the multi-layer reconstruction of the video signal comprises a higher quality rendition of a base video signal decoded from the base video stream.

17. The video decoder of claim 16, wherein data for the second layer comprises frames of residual data that are combined with frames of the base video signal as decoded from the base video stream.

18. The video decoder of claim 17, wherein the second layer comprises a Low Complexity Enhancement Video Coding (LCEVC) video stream.

19. A non-transitory computer-readable medium comprising instructions which when executed cause a processor to perform the following operations:

receiving a first packet sub-stream for the first layer, each packet of the first packet sub-stream comprising a header and a data payload, the first packet sub-stream being identified via a first packet identifier indicated in the header and being received as part of a transport stream;

receiving a second packet sub-stream for the second layer, each packet of the second packet sub-stream comprising a header and a data payload, the second packet sub-stream being identified via a second packet identifier indicated in the header and being received as part of the transport stream;

joining packets from the first packet sub-stream and the second packet sub-stream to generate a joint elementary packet stream, the joint elementary packet stream comprising a sequence of packets comprising data for both the first layer and the second layer, a payload of the joint elementary packet stream comprising a sequence of network abstraction layer units for the first layer concatenated with a sequence of network abstraction layer units for the second layer;

providing the joint elementary packet stream to a first layer decoder for decoding of the data for the first layer within the joint elementary packet stream;

providing the joint elementary packet stream to a second layer decoder for decoding of at least the data for the second layer within the joint elementary packet stream, wherein the first layer decoder differs from the second layer decoder; and combining an output of the first layer decoder and an output of the second layer decoder to provide a multi-layer reconstruction of a video signal.

* * * * *